(12) United States Patent
Aldrich

(10) Patent No.: US 6,615,198 B1
(45) Date of Patent: Sep. 2, 2003

(54) SYSTEM AND METHOD FOR CREATING PERFORMANCE SOLUTION TOOLS AND PERFORMANCE SOLUTIONS

(75) Inventor: Daniel J. Aldrich, Countryside, KS (US)

(73) Assignee: Sprint Communications Company, L.P., Overland Park, KS (US)

(*) Notice: Subject to any disclaimer, the term of this patent is extended or adjusted under 35 U.S.C. 154(b) by 0 days.

(21) Appl. No.: 09/545,760

(22) Filed: Apr. 10, 2000

(51) Int. Cl.[7] .............................. G06F 17/00; G06N 5/02
(52) U.S. Cl. .............................. 706/47; 706/45; 706/46
(58) Field of Search ..................... 706/47, 45, 46

(56) References Cited

U.S. PATENT DOCUMENTS

| | | | |
|---|---|---|---|
| 4,656,603 A | 4/1987 | Dunn | 364/900 |
| 5,159,687 A | 10/1992 | Richburg | 395/700 |
| 5,204,939 A | 4/1993 | Yamazaki et al. | 395/51 |
| 5,295,222 A | 3/1994 | Wadhwa et al. | 117/104 |
| 5,412,576 A | 5/1995 | Hansen | 364/468 |
| 5,450,545 A | 9/1995 | Martin et al. | 395/700 |
| 5,546,507 A | 8/1996 | Staub | 395/76 |
| 5,574,828 A | 11/1996 | Hayward et al. | 395/50 |
| 5,634,021 A | 5/1997 | Rosenberg et al. | 395/353 |
| 5,640,567 A | 6/1997 | Phipps | 395/703 |
| 5,701,400 A | 12/1997 | Amado | 395/76 |
| 5,999,948 A | 12/1999 | Nelson et al. | 707/506 |
| 6,029,258 A | 2/2000 | Ahmad | 714/46 |
| 6,053,951 A | 4/2000 | McDonald et al. | 717/109 |
| 6,064,982 A | 5/2000 | Puri | 705/27 |
| 6,070,149 A | 5/2000 | Tavor et al. | 705/26 |
| 6,081,263 A | 6/2000 | LeGall et al. | 345/327 |
| 6,117,187 A | 9/2000 | Staelin | 717/169 |
| 6,141,724 A | 10/2000 | Butler et al. | 711/107 |
| 6,163,878 A | 12/2000 | Kohl | 717/100 |
| 6,170,081 B1 | 1/2001 | Fontana et al. | 717/104 |
| 6,192,518 B1 | 2/2001 | Neal | 717/11 |
| 6,201,948 B1 | 3/2001 | Cook et al. | 434/350 |
| 6,226,656 B1 | 5/2001 | Zawadzki et al. | 707/506 |
| 6,230,309 B1 | 5/2001 | Turner et al. | 717/107 |
| 6,230,318 B1 | 5/2001 | Halstead et al. | 717/108 |

OTHER PUBLICATIONS

Eric Evans et al; Using Java Applets and Corba for Multi–User Distributed Applications; May–Jun. 1997; IEEE; 1089–7801/97; 43–55.*

* cited by examiner

Primary Examiner—Wilbert L. Starks, Jr.
Assistant Examiner—Joseph P. Hirl
(74) Attorney, Agent, or Firm—Harley R. Ball; Steven J. Funk; Kevin D. Robb

(57) ABSTRACT

A system and method for creating solution tools has components listed for any potential solution to a solution tool, a set of questions outlining requirements for the solution tool, and options that may be selected for each of the questions. Graphics, including template graphics and component graphics that graphically depict each component, are created using a graphic engine. Logic rules assign components to selectable options. The logic rules are saved as assembled logic. When the assembled logic is interpreted and executed, it determines components and graphics that are required for any potential solution based upon the selected options. When the solution tool is used by a user, the user selects options to the answers, and the solution tool dynamically generates a component list report listing all of the components required for the solution and a graphic report having graphics that graphically depict the required components for the solution. Hyperlinks may be attached to the graphics on the graphic report or to the components on the component list report. The hyperlinks link to media, such as training media.

73 Claims, 19 Drawing Sheets

FIG. 5

| SHORT DESC | DESCRIPTION |
|---|---|
| AX-AU1 | ATM NNI SERVICE MODULE, 8T1 PORTS |
| AX-FR1 | FRAME RELAY SERVICE MODULE, 8 FRACTIONAL T1 PORTS |
| AX-FR2 | FRAME RELAY SERVICE MODULE, 8 CHANNELIZED T1 PORTS |
| AX-RR1 | 8 PORT T1 REDUNDANT BACK CARD WITH RJ48 CONNECTORS |
| AX-RJ | 8 PORT T1 BACK CARD WITH RJ48 CONNECTORS |
| AX-SR | MGX1 FOR NT1/E1 SM RED LICENSE |
| CAB-5686 | RJ-45 Y CABLE FOR REDUNDANT UI CARDS |
| CAB-5MOD | DB-25 (RS232) MALE TO RJ-45 DCE MODEM ADAPTER |
| CAB-SMF | Y CABLE FOR SMF REDUNDANT OC-3 |
| CAB-T3 | Y CABLE FOR REDUNDANT DS-3 |
| MGC-PL | INTAKE AND OUTTAKE PLENUMS FOR MGX 8850 |
| MGX-8850 | BACK VIEW OF THE 8850 CHASSIS |

FIG. 6

| NO. | QUESTION TEXT |
|---|---|
| 1 | WHAT MOUNTING OPTION WOULD YOU LIKE TO USE? |
| 2 | WHAT IS THE NETWORK ACCESS FOR THIS SITE? |
| 3 | DO YOU REQUIRE REDUNDANCY FOR THE SWITCH CONTROL MODULE? |
| 4 | DO YOU REQUIRE SWITCH POWER REDUNDANCY? |
| 5 | WILL THIS BE AC OR DC POWERED? |

| NO. | OPTION TEXT |
|---|---|
| 1 | EXISTING 19" RACK |
| 2 | EXISTING 23" RACK |
| 3 | STAND ALONE CABINET |
| 4 | ORDER NEW 19" RACK |
| 5 | ORDER NEW 23" RACK |

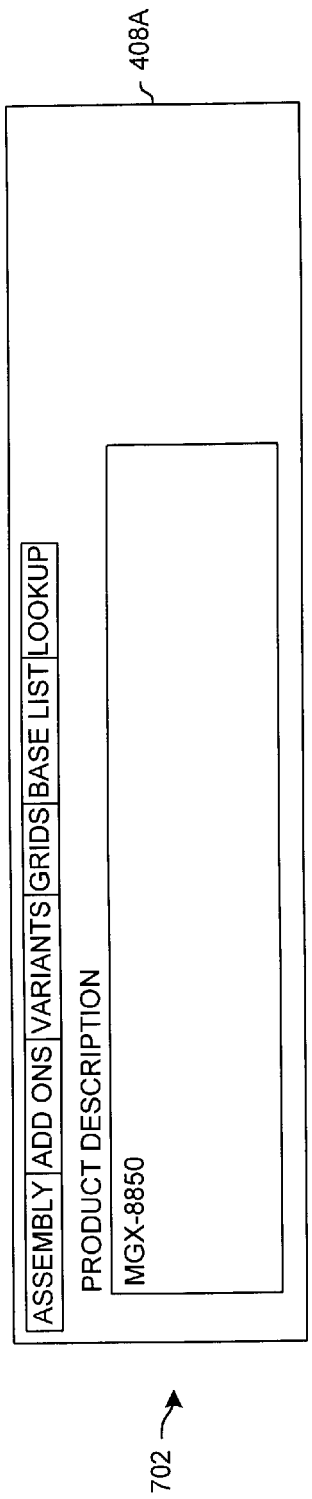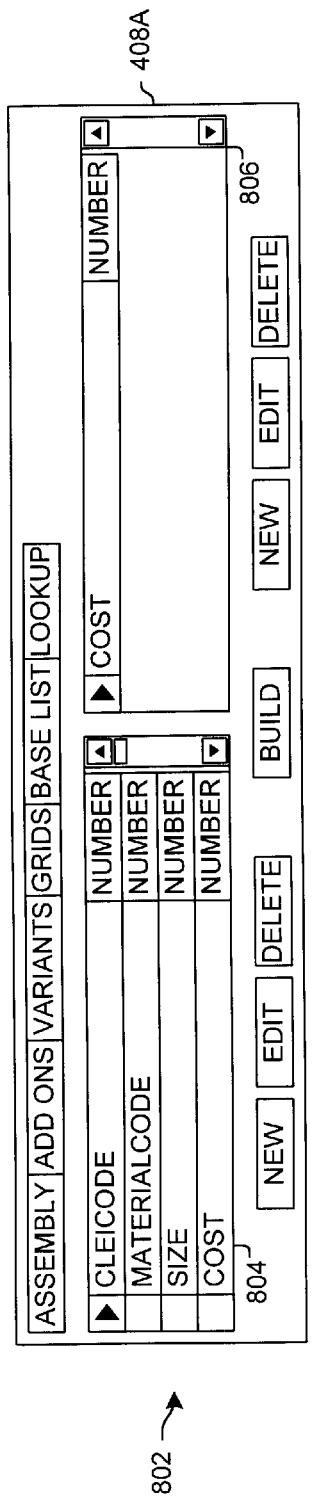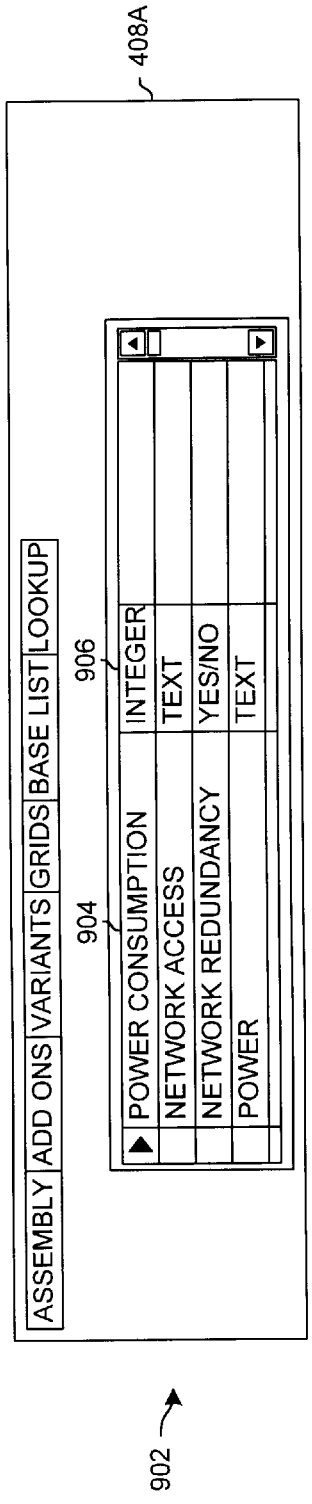

| QUESTIONS | GRAPHIC | REPORT | MEDIA |
|---|---|---|---|
| 2204 | 2206 | 2208 | 2210 |

| COMPONENT SHORT DESCRIPTION | COMPONENT DESCRIPTION | | | |
|---|---|---|---|---|
| CS8850-ACR | PACKAGE 3 | 0 | 3 | -1 |
| MGX-AC-RACK2 | AC POWER WITH REDUNDANCY 8850 PACKAGE | 1 | 3 | 0 |
|  | MGX 8850 AC SHELF, DUAL FEED | 1 | 3 | 0 |
| TBD | ADDITIONAL REQUIRED EQUIPMENT | 0 | 5 | -1 |
|  | RJ-45 NULL MODEM CABLE | 1 | 5 | 0 |
| 8P-MAS and MOD-336 | DATAPROBE, 8 PORT (429200) AND INTERNAL MODEM | 1 | 5 | 1 |
| BC-00504 | ECHO CANCELLER TO DATAPROBE CABLE | 1 | 5 | 1 |
| TL-ECHOPKG | ECHO CANCELLER PACKAGE FOR AC POWER | 1 | 5 | 1 |
| 2572 | ECHO CANCELLER T1 CARD, ONE PER T1 OF VOICE | 3 | 5 | 1 |
| 8007 | POWER SUPPLY, 48 VDC FOR AC | 1 | 5 | 1 |
| 2555A | ALARM AND ACCESS MODULE | 1 | 5 | 1 |
| 255A | 16 POSITION SHELF, HOLDS UP TO 16 T1 EC | 1 | 5 | 1 |
| 80.0443 | WIRING HARNESS | 1 | 5 | 1 |
| HMW06004-11 | HENDRY FUSE PANEL | 1 | 5 | 1 |
| GMT3 | GMT-3 AMP FUSE | 1 | 5 | 1 |
| GMT1 | GMT-1 AMP FUSE | 1 | 5 | 1 |
| 911CB-15 | POWER STRIP 6 OUTLET RACKMT | 1 | 5 | 3 |
|  | SERVICE MODULE REDUNDANCY COMPONENTS | 0 | 7 | -1 |
| MGX-SRM-3T3/B | SRM WITH 3 CHANNELIZED T3 PORTS | 1 | 7 | 0 |
| MGX-BNC-3T3-M | BACK CARD FOR SRM, 3 PORT DS3 | 1 | 7 | 0 |
| AX-R-RJ48-8T1 | 8 PORT T1 REDUNDANT BACK CARD WITH RJ48 | 2 | 7 | 3 |
|  | CIRCUIT EMULATION SUPPORTING COMPONENTS | 0 | 10 | -1 |
| AX-CESM-8T1 | 8 PORT EMULATION SERVICE MODULE | 4 | 10 | 0 |
|  | ATM AND PXM SUPPORTING COMPONENTS | 0 | 12 | -1 |
| CAB-5686-06 | RJ-45 CABLE FOR REDUNDANT UI CARDS | 2 | 12 | 0 |

FIG. 25

| QUESTIONS | GRAPHIC | REPORT | MEDIA |

2204, 2206, 2208, 2210

2202

| | |
|---|---|
| 5. | USING A STANDARD SCREWDRIVER, TIGHTEN THE SCREWS ON HTE TOP AND THE BOTTOM OF THE CARD |
| 6. | CONNECT THE APPROPRIATE CABLES TO THE BACK OF THE BACK CARD.<br><br>NOTE: OC-3 AND DS3 CARDS DISPLAY GREEN LED LIGHTS FOR ACTIVE WHEN SUCCESSFULLY REPLACED. DS1 CARDS NOT NOT USE LED LIGHTS. |

FIG. 26

SYSTEM AND METHOD FOR CREATING PERFORMANCE SOLUTION TOOLS AND PERFORMANCE SOLUTIONS

FIELD OF THE INVENTION

The present invention relates to the field of generating performance solutions with a computer implemented solution tool creator and one or more solution tools created by the solution tool creator.

BACKGROUND OF THE INVENTION

Computer programs and processes are created for performance analysis and for creating solutions for building systems and performing processes. Many of these systems and processes are complex, and creating the programs to perform the analysis and to create the solution takes a significant amount of time. In addition, when the process or system is complex, it is difficult to program all of the steps that require performance due to the amount of detail required for the solution. Moreover, because of the significant time required, sometimes months, the process or system required for the solutions may change before the programming is complete. Therefore, an improved system is needed to perform analysis of requirements for a solution and to do so in a more responsive period of time.

SUMMARY OF THE INVENTION

The present invention is directed to a system for determining requirements for a solution. The system comprises at least one solution tool comprising solution selections and solution tool code that, when executed, creates at least one of a component list report and a graphic report. The system includes a solution tool creator configured to create the solution tool, a main website configured to enable downloading the solution tool, and a solution system database configured to store the solution tool creator, the solution tool, and the website and to operate the solution tool creator and the website.

The present invention further is directed to a system for creating a solution tool. The system comprises a component engine configured to enter components that may be required for any solution to the solution tool, an options engine configured to enter questions that prompt selections for determining requirements for the solution and options to be selected for the questions, and a graphic engine configured to create graphics and to assign at least one of the graphics to at least one of the components. The system also includes a rules engine configured to create logic rules comprising operators associating components to options that can be selected to the questions that, when executed, determine required components and required graphics for the solution based upon the selected options. In some configurations, the system may include an assembly engine configured to assign positions and placement order for the graphics and to define properties for components.

Further, the present system is directed to a system for creating a solution. The solution comprises solution selections comprising questions and options, wherein the questions each have at least one of the options that can be selected to determine the solution. The system further includes solution requirements comprising at least one of a component list report listing required components for the solution and a graphic report displaying graphics comprising graphical representations of the required components for the solution. The system also includes an interpreted solution code configured to generate the questions, receive selected options, and process the selected options to determine the required components.

Some configurations include an interpreter configured to automatically convert the solution tool code from the assembled logic format to an interpreted solution tool code that is executable for determining any solution to the solution tool. Some configurations include a downloadable database configured to download the interpreter and the solution tool to the user.

The present invention also is directed to a method for creating a solution tool. The method comprises creating a component list having a plurality of components and creating selections having questions that outline requirements for any potential solution to the solution tool and options that identify alternatives to the questions. Graphics are created, and each of graphic is assigned to one of the components. The method further includes creating logic rules that assign components to selectable options and that, when executed, determine required components and required graphics for any potential solution based upon the selected options.

BRIEF DESCRIPTION OF THE DRAWINGS

FIG. 5 is a screen diagram of a component panel of the solution tool creator of FIG. 4.

FIG. 6 is a screen diagram of an options panel of the solution tool creator of FIG. 4.

FIG. 7 is a screen display of an assembly panel of the solution tool creator of FIG. 4 with an assembly tab.

FIG. 8 is a screen display of an assembly panel of the solution tool creator of FIG. 4 with an add ons tab.

FIG. 9 is a screen display of an assembly panel of the solution tool creator of FIG. 4 with a variants tab.

FIG. 25 is a screen display of the solution tool of FIG. 21 with a component list report tab.

FIG. 26 is a screen display of the solution tool of FIG. 21 with a media tab.

DETAILED DESCRIPTION

Figure 1:
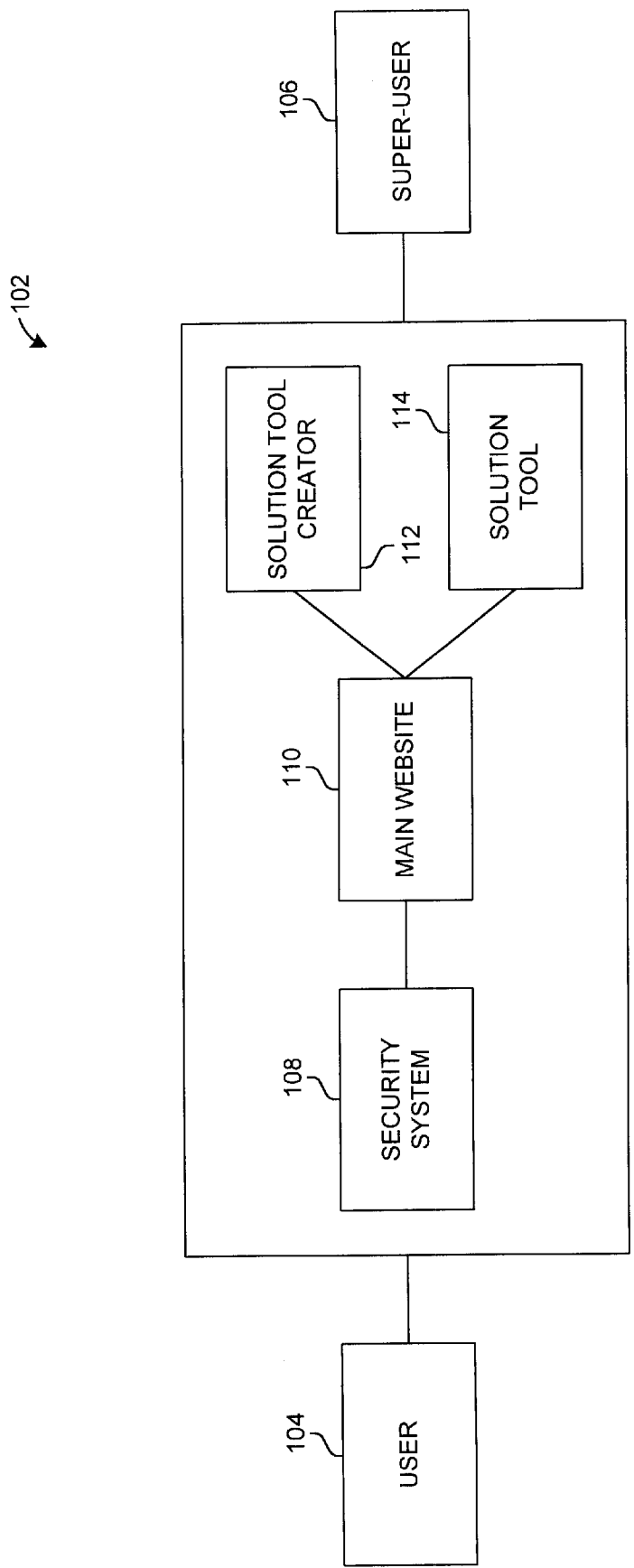
FIG. 1 is a block diagram of a solution creation system in accordance with an embodiment of the present invention.

Determining requirements and creating solutions for complex systems and processes is time consuming and requires trained personnel to make the determinations. Training personnel to make these determinations is expensive and time intensive. Also, programming a computer to determine or to implement such systems or processes is expensive and time intensive.

An improved system is needed to efficiently and inexpensively create solutions for requirements for systems and processes. An improved system is needed that can be used by a person that is untrained or minimally trained in the complexities of the system or process.

The present invention uses object oriented systems so that when portions of the system are to be changed, not all of the system must be changed. In addition, this allows portions of the system to be reused in various embodiments. This object oriented implementation allows a super-user to quickly generate solution tools.

The present invention allows a super-user to build a solution tool for a user in a significantly reduced time frame. Instead of having to manually write programming to create a solution tool, a super-user now can use the solution tool creator to list components that may be used for a potential solution, list questions and options used to determine a particular solution, and create logic rules to write code to finalize a determination of the solution based upon options selected by a user to questions. The super-user is able to create a solution tool using the solution tool creator in many cases in less than one-tenth of the time it would have taken to program a solution tool using prior systems and methods.

In addition, the present invention allows a super-user to attach media, such as graphics, digital video, pictures, hyperlinks, and other media to, or in connection with, reports and graphics generated to a user for a completed solution. This media can be used to train or educate a user about components in the system, methods of operating the system, or building or operating components of the system or the system itself.

This ability to provide training for the solution or component requirements of the solution means that users of the system are not required to be trained ahead of time. In fact, the questions and options presented to the user in the solution tool are such that a user need not be an expert or even a highly trained person in the technology being implemented.

This reduces a significant cost for training currently required for prior systems. Normally a person first is trained and educated about a system or potential solutions. Therefore, the system of the present invention takes a different approach of reducing a complex potential system to a series of easy to answer questions with pre-defined options. Training is provided to a user as needed by the user in an on-line basis. Moreover, the user can select the training or other information the user needs.

The solutions have a graphic report portion that graphically displays a view of the solution. Hyperlinks linked to training, descriptions, or components are associated with each component in the solution.

In the present invention, a super-user uses the solution tool creator to build a solution tool. This building process is fast because the solution tool creator has a rules engine that allows specific code to be built. Building the code is a point-and-click process. The super-user simply clicks on a component, clicks on a question/option combination, and clicks on logic buttons in the rules engine to create rules and code. The super-user can define graphics that can be displayed showing the solution requirements once it has been created.

Moreover, preferably the system is accessed via an internet connection or an intranet connection (IP connection) via a web browser. This allows a super-user or a user to access the system from varied locations. This also provides a central location from which a super-user can create solution tools, from which a user can download solution tools, and to which a user can upload completed solution tools for parsing to any system and for ordering or viewing by the super-user or other users. Since the solution tools can be viewed or operated with any standard browser or in a form window independent of an operating system, no special software need be used.

The system has the ability to automatically update solution tools, interpreters, and drivers used by a user or a super-user. When a user or super-user logs onto the system, the system automatically checks the user or super-user's computer to see if the latest drivers, interpreters, and solution tools are loaded on the computer. If the latest drivers, interpreters, and solution tools are not on the computer, the system will automatically update them. This functionality ensures that the users and super-users have the latest drivers, interpreters, and solution tools and reduces time by a user or super-user to manually update these items.

FIG. 1 illustrates an exemplary embodiment of a solution creation system of the present invention. The solution creation system (SCS) 102 can be accessed by a user 104 and a super-user 106 and comprises a security system 108, a main website 110, a solution tool creator (STC) 112, and a solution tool 114.

The user 104 accesses the SCS 102 to download solution tools, to upload completed solution tools, i.e. solutions, for viewing by the super-user 106 or other users, and to link to training or media. The user 104 connects to the SCS 102 via an IP connection, giving the user the ability to connect to the SCS from a variety of locations. The user 104 executes the solution tools to determine solution requirements for a system or process. Only one user 104 is shown in the Figures for clarity. However, multiple users may exist.

The super-user 106 can access the SCS 102 to view or to create solution tools. The super-user 106 creates the solution tool 114 by creating selections, graphics, component lists, and logic therefore. As the super-user creates the solution tool 114, the logic is assembled. The super-user 106 then can activate or deactivate the solution tool 114 to make the solution tool available or not available for download by the user 104. In some instances, the super-user 106 also may be a user 104. Only one super-user 106 is shown in the Figures for clarity. However, multiple super-users may exist. As used herein, "create" means to create or to modify. As used herein, "selection" means questions and options or answers to the questions.

The security system 108 requires a user to log onto the SCS 102 by entering a valid user identification (ID) and an associated password. The user 104 can only enter the main website 110 after a valid user ID and password have been entered and verified by the SCS 102. This prevents non-authorized users from entering and using the SCS 102 and viewing or downloading data from the SCS. Optionally, users can be provided different levels of access, access to different solution tools, or the ability to view one or more completed solution tools based on the user ID and password.

Preferably, the super-user 106 has direct access to the SCS 102 through a secure transmission media, such as a pre-defined intranet address or other IP connection. However, the SCS 102 can be configured to require the super-user 106 to enter the SCS through the security system 108 on an intranet address, an internet address, a direct access line, or another transmission media.

The main website 110 is the main entry point to the SCS 102 for the user 104 after the user logs onto the SCS. From the main website 110, a user 104 can download one or more solution tools, upload one or more completed solution tools, view one or more completed solution tools, obtain help from on-line help, or send feedback to the super-user 106.

The main website 110 displays current information about solution tools. For example, the main website 110 displays a list of solution tools and the latest, most current date of creation or update for the solution tools.

The main website 110 provides an update option to update any solution tools and software, such as drivers and interpreters, that a user 104 might need to download, use, or complete a solution tool. After a user 104 logs onto the SCS 102, this update option automatically checks the solution tools and software of the user's computer and displays a list of solution tools and/or software, or portions thereof, that are out of date or have been modified since the user last logged onto the SCS. A user 104 then can opt to update the out of date solution tools and/or software, or portions thereof, such as questions, components, options, or graphics. If a user 104 selects an update option, the update is loaded to the user's computer or other system.

The STC 112 is used to create solution tools for systems, devices, or processes. The STC 112 has a component panel used to define components that would be used to define requirements for a solution when the solution tool is used, an options panel used to define potential selections for components, and a rules engine used to build logic that, when used, builds a solution of requirements for components according to options selected for questions. Optionally, the STC 112 may have a graphic engine to associate graphics with components and an assembly panel used to define properties for components, graphics, and logic. Preferably, only the super-user 106 has access to the STC 112.

The solution tool 114 comprises selections, graphics, including component graphics and template graphics, component identifications, and logic rules. When the solution tool 114 is used by the user 104, the logic rules operate to present the questions and options, process the options, dynamically build one or more component list reports identifying components required for the solution, i.e. the solution requirements, as the user selects options to the questions, dynamically build one or more graphic reports depicting the solution requirements as the user selects options to the questions, and present hyperlinks that can connect the user to training media or to the on-line help. Optionally, the solution may have one or both of the component list report or the graphic report, and the hyperlinks may be included or excluded for any particular option. Only one solution tool 114 is shown in the Figures for clarity. However, multiple solution tools may exist, and one or more of the solution tools may be downloaded and used by a user.

The system of FIG. 1 operates as follows. In a first example, the super-user 106 logs onto the SCS 102 to create a tool. The super-user 106 connects to the SCS 102 via an IP connection, such as an intranet connection, and opens the solution tool creator 112. In this example, the super-user 106 does not have to go through the security system 108 or the main web site 110 to open the solution tool creator 112. The super-user 106 uses the solution tool creator 112 to create the solution tool 114. Once the solution tool 114 is created, the super-user 106 activates the solution tool so that it may be downloaded by the user 104.

In another example, the user 104 logs onto the SCS 102. In this example, the user 104 first enters the security system 108 where the user must enter a valid user ID and password to log onto the SCS 102. The user 104 enters a valid user ID and password at the security system 108, and the user is linked to the main website 110. At the main web site 110, a list of solution tools that can be downloaded are displayed to the user 104. The user 104 selects and downloads the solution tool 114. The user 104 then completes the solution tool 114 to obtain a solution that identifies required components for the solution.

In this example, the solution tool 114 is designed to enable the user 104 to determine components that are required to be installed at a particular location for a telecommunications switch. By completing the solution tool 114, the solution to the solution tool identifies all components that are required for the particular installation of that telecommunications switch at that location.

Figure 2:
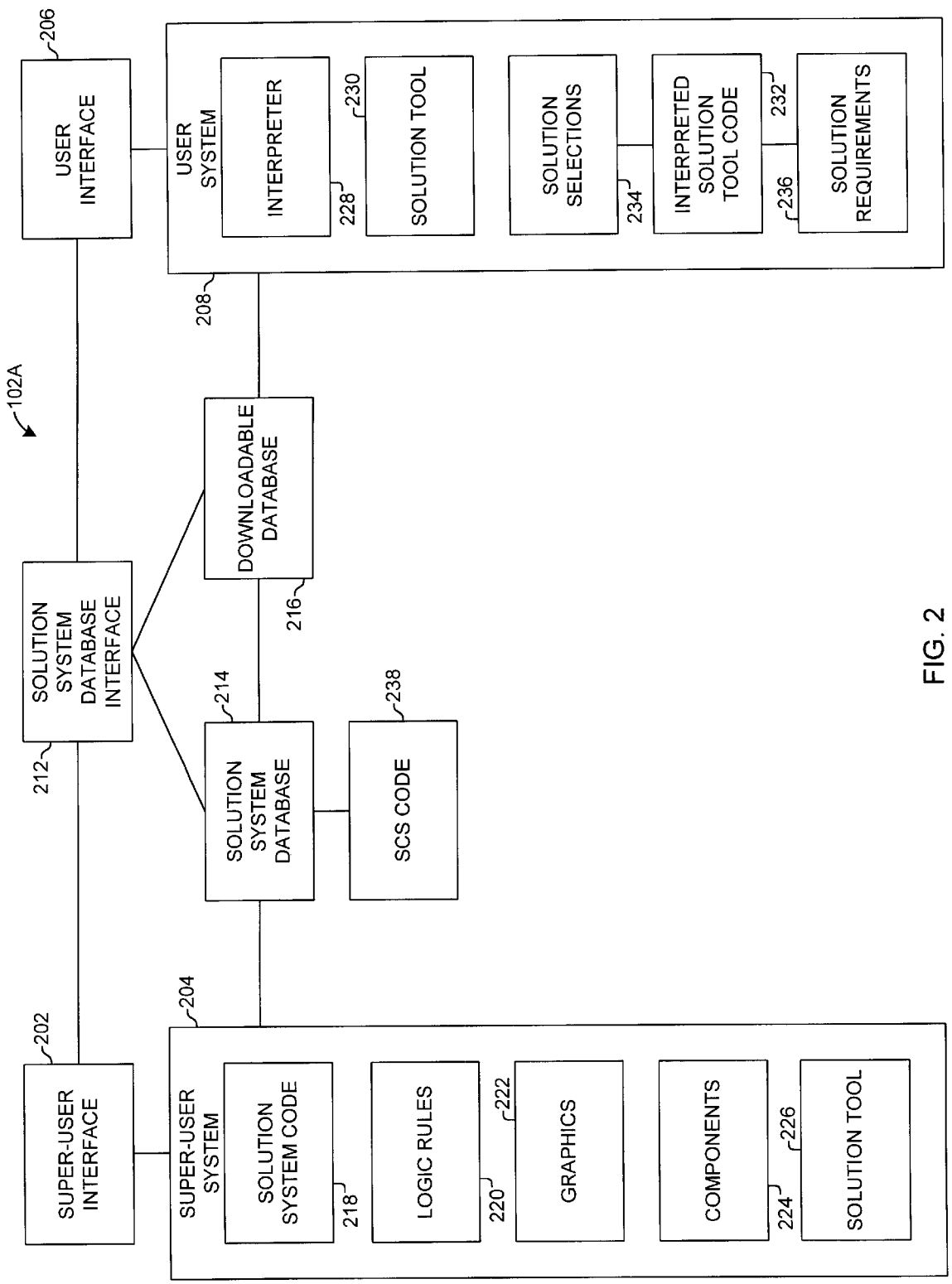
FIG. 2 is a block diagram of elements of a solution creation system identified with exemplary interfaces in accordance with an embodiment of the present invention.

FIG. 2 depicts an exemplary embodiment of elements of an SCS 102A identified with exemplary interfaces. It will be appreciated that FIG. 2 depicts logical elements of the SCS 102A in one of multiple embodiments at a particular point. At other points, one or more of the logical elements may not be present.

The SCS 102A of FIG. 2 depicts a super-user interface 202, a super-user system 204, a user interface 206, a user system 208, a database interface 212, a solution system database 214, and a downloadable database 216. The elements of FIG. 2 are depicted with the interfaces 202, 206, and 212 connected to each other and to the respective super-user and user systems 204 and 208 and the solution system and downloadable databases 214 and 216 to illustrate that any of the elements depicted as residing on the super-user and user systems and the downloadable database may be present on the solution system database in a volatile or non-volatile form.

The super-user interface 202 is any device, system, software, or combination thereof that allows the super-user to communicate with the solution system database 214 via the solution system database interface 212. Thus, the super-user interface 202 comprises a processor interface, a computer interface, an input/output device, and any other device, system, or software that is configured to transmit and receive communications.

The super-user system 204 is any device, system, software, or combination thereof with which a super-user operates the SCS 102A or elements of the SCSA to create one or more solution tools or otherwise perform administration functions for the SCS 102A. In the example of FIG. 2, the super-user system 204 has solution system code 218 for an STC, as described more fully below, including logic rules 220, graphics 222, and components 224. The super-user system 204 also has a solution tool 226. Although the STC (see FIG. 1) operates on the super-user system 204, it is not shown. As used herein, "code" means any programming, code, or software in any form.

The solution system code 218 operates the STC, displays to the super-user 106 the STC Panels, and enables viewing, creating, and processing, i.e. completing at least partially, solution tools. The solution system code 218 enables a super-user to activate a solution tool to make the solution tool accessible to a user or to deactivate a solution tool so that it is not available to a user. The solution system code 218 is a portion of the SCS code that is used by the super-user system 204.

The logic rules 220 include the rules engine used by the super-user to create solution tools. The rules engine is a simple, easy to use point-and-click control pad with logic buttons that allows a super-user to create the logic rules that determine requirements for a solution based upon selected options to questions in a solution tool. The rules engine has a base set of logic buttons with operators that can be used to create any logic statements or logic rules needed to implement any solution. The logic statements and logic rules are created by clicking on logic buttons, components listed in the component list, selections, and graphics.

Once the logic rules and logic statements are created, the rules engine dynamically converts the created logic rules to assembled logic in an assembled logic format (solution tool code) that can be used to complete a solution tool once interpreted, even if the solution tool is not completed and ready for use. The logic rules 220 are saved as part of a created solution tool on the solution system database 214 as the solution tool code. This format allows a solution tool, including the logic rules, to be saved in an easy to save and transmit format that requires a relatively small amount of storage space. Many solution tools require less than five hundred kilo bytes of storage.

The components 224 include stored component descriptions used for solution tools and a component engine. The component engine is used to create component lists that are used when creating solution tools.

The solution tool 226 is any solution tool that can be used by a user to determine requirements for a solution to a process, a device, or a system. The solution tool 226 includes logic rules saved in the assembled logic format, graphics, selections, and components. Although only one solution tool 226 is depicted in FIG. 2, multiple solution tools can exist.

The solution tool 226 resides in two forms. Prior to being downloaded by a user, the solution tool 226 has solution tool code with assembled logic that was created by the super-user. Associated with the assembled logic are the selections that list the questions and the available options or entries for the questions and an identification of components that may be required for any potential solution. Also part of the solution tool are template graphics and component graphics that are associated with each possible selection that can be made. After being downloaded by a user, the solution tool 230 is interpreted by the interpreter 228 as described more fully below.

The user interface 206 is any device, system, software, or combination thereof that allows the user to communicate with the solution system database 214 and/or the downloadable database 216 via the solution system database interface 212. Thus, the user interface 206 comprises a processor interface, a computer interface, an input/output device, and any other device, system, or software that is configured to transmit and receive communications.

The user system 208 is any device, system, software, or combination thereof with which a user generates one or more solutions using one or more solution tools. In the example of FIG. 2, the user system 208 has an interpreter 228, a solution tool 230, interpreted solution tool code 232, solution selections 234, and solution requirements 236.

The interpreter 228 is an engine that changes solution tool code into interpreted solution tool code. The interpreter 216 is downloaded from the downloadable database 216 to the user system 208. The interpreter 228 has a set of drivers that enables a user system 208 to download solution tools from the downloadable database 216 and to upload completed solution tools to the downloadable database.

As explained above, the solution tools are created in a simple, easy to use logic rules. The logic rules contain logic statements that can be created by point-and-click logic buttons in the rules engine and by selecting components and operators from defined lists, as explained more fully below. The logic rules are saved in the solution tool on the solution system database 214 in the assembled logic format. This format allows a solution tool, including the logic rules, to be saved in an easy to save and transmit format that requires a relatively small amount of storage space.

The interpreter 228 automatically converts the solution tool from the assembled logic format to a format that is executable. Thus, the user of the user system 208 does not have to manually convert the solution tool to an executable format, and the automatic conversion process is seamless to the user. Preferably, the interpreter 228 converts the solution tool to JAVA using lookup tables.

It will be appreciated that the interpreter 228 automatically writes the solution tool executable code. Therefore, a user does not require programming knowledge. In addition, the super-user does not require extensive knowledge of programming or the ability to write executable code because the rules engine has the point-and-click entry system, and the interpreter 228 writes the executable code. This makes completing the rules logic an easy task.

The solution tool 230 represents a solution tool that has not been converted with the interpreter 228. It will be appreciated that the solution tool 230 that has not been interpreted and the interpreted solution tool may not both be present on the user system 208.

The interpreted solution tool code 232 is the portion of the interpreted solution tool that executes when a user is completing a solution tool. The interpreted solution tool code 232 operates to generate selections to a user, including questions and options, store information about a solution to a solution tool, such as options to questions, determine solution requirements based on selected options, and generate solution requirements, including a component list report, a graphic report, or media. The interpreted solution tool code 232 determines which questions are to be generated to a user, which additional questions are to be generated to a user based upon prior selected options, and which components are to be added to solution requirements 236 based upon selected options. The interpreted solution code 232 also controls hyperlinking to media, such as training media, and generating on-line help. The interpreted solution tool code 232 preferably is JAVA code.

The interpreted solution tool code 232 includes all of the graphics, including component graphics and template graphics, that may be needed for any potential solution to the solution tool 230. The interpreted solution tool code 232 also includes a list and identification of all of the components that may be selected as options for any potential solution to the solution tool 230. Further, the interpreted solution code 232 includes any potential hyperlink to media and any potential included media or on-line help.

For example, a first solution to the solution tool 230 may have a first subset of selected components with their associated first subset of component graphics, template graphics, hyperlinks to training media, and on-line help. A second solution to the solution tool may have a second subset of selected components with their associated second subset of component graphics, template graphics, hyperlinks to training media, and on-line help.

The interpreted solution tool code 232 dynamically builds a solution based upon selected options as the options are selected for the questions in the solution tool 230. Therefore, as questions are presented to the user and options are selected, the interpreted solution tool code 232 selects a template graphic that corresponds to the total solution and adds component graphics to the template graphic to build a graphic report based upon individual selected options as those options are selected. Thus, for example, after options are selected for three questions, the graphic report may have a template graphic with two component graphics corresponding to two required components. Whereas, for example, after options are selected for five questions, the graphic report may have a template graphic with three component graphics corresponding to three required components.

Similarly, the interpreted solution code 232 dynamically builds a component list report. Therefore, as questions are presented to the user and options are selected, the interpreted solution tool code 232 selects components required for the solution and adds the required components to a component list report listing the required components for the solution. Thus, for example, after options are selected for three questions, a component list report with two required components may be displayed. Whereas, for example, after options are selected for five questions, the component list report may be displayed with three required components.

Additionally, the interpreted solution tool code 232 dynamically generates hyperlinks to media for selected components, component graphics, and template graphics. Therefore, as questions are presented to the user and options are selected, the interpreted solution tool code 232 selects hyperlinks required for the solution and attaches the hyperlinks to component graphics or template graphics in the graphic report or to components in the component list report for the solution. Thus, for example, after options are selected for three questions, hyperlinks are attached to two required components in a component list report, to the template graphic in the graphic report, and to the two corresponding component graphics in the graphic report. Whereas, for example, after options are selected for five questions, hyperlinks are attached to three required components in a component list report, to the template graphic in the graphic report, and to the three corresponding component graphics in the graphic report.

The solution selections 234 are the portion of the interpreted solution tool that is generated to the user as questions and options, including entries. The solution selections include components selected as options or other components entered in entry locations as answers to questions.

The solution requirements 236 are the required components for the completed, or partially completed, solution tool 230. The solution requirements 236 include one or more of a component list report identifying the required components for the solution, a graphic report displaying the required components as template graphics and component graphics, hyperlinks to media, and media not connected via a hyperlink.

The solution system database 214 is the access point for the super-user system 204 and the user system 208 to the SCS 102A. The solution system database 214 contains all stored information, including solution tools, graphics, components, and media, and performs all functions and executions, including operating the STC for the super-user and controlling transfer and storage of information to and from the super-user system 204 and the user system 208.

The solution system database 214 stores the solution tools, both those that are active and can be downloaded by a user and those that are inactive. The solution system database 214 also stores completed solutions that are uploaded by a user.

The solution system database 214 has SCS code 238 that operates the SCS 102A. The SCS code 238 executes the STC that is used by the super-user to create solution tools. The SCS code 238 also controls the security system and maintains all links with users and super-users, either through the main website or through a direct link (see FIG. 1).

Because the SCS 102A is web-based, most functions are executed by the SCS code 238 and not by code residing on the super-user system 204. Thus, the STC functions are executed from the SCS code 238 on the solution system database 214.

The SCS code 238 automatically updates the super-user system 204 with the STC and with solution tools. When a super-user connects to the SCS 102A, the SCS code 238 determines if the super-user system 204 has the newest solution tools residing on the super-user system 204, and, if the super-user system has an interpreter or stored elements of an STC, the SCS code determines if the super-user system has the newest interpreter or STC elements. If the super-user system 204 does not have the newest solution tools, interpreter, or STC elements, the SCS code 238 prompts the super-user to update them. The super-user then can select the option to complete the update. Optionally, the SCS code 238 can complete the update without prompting the super-user.

Likewise, the SCS code 238 automatically updates the user system 208 with solution tools and the interpreter. When a user connects to the SCS 102A, the SCS code 238 determines if the user system 208 has the newest solution tools and the newest interpreter. If the user system 208 does not have the newest solution tools or the newest interpreter, the SCS code 238 prompts the user to update them. The user then can select the option to complete the update. Optionally, the SCS code 238 can complete the update without prompting the user.

The downloadable database 216 is an interface that downloads solution tools and the interpreter to the user system 208, enables uploading completed solutions, and enables viewing other completed solutions. The downloadable database 216 communicates with the solution system database 214 and transfers solution tools and completed solutions with the solution system database.

The SCS 102A of FIG. 2 operates as follows. In a first example, a super-user connects to the solution system to create a solution tool. The super-user system 204 connects through the super-user interface 202 to the solution system database 214 via the solution system database interface 212. The super-user system 204 opens a solution tool creator that resides on the solution system database 214. While the solution tool creator is operated by the SCS code 238, portions of the solution tool creator operate from the super-user system 204 and/or are stored in volatile or nonvolatile memory on the super-user system. In addition, the solution system code 218 operates on the super-user system 204 to implement the solution tool creator.

The super-user creates a solution tool 226 using the solution tool creator. In this example, the solution tool 226 will be used to determine requirements for a computer. The super-user uses the component engine in the components 224 to define components that may be required for any computer that may be built using the computer solution tool 226. Examples of components include a first processor, a second processor, a hard drive, a disk drive, a compact disk (CD) drive, a mouse, a track ball, a power supply, a back up power supply, a keyboard, a large display, a small display, and whether the computer is portable or not portable.

The super-user also creates component graphics and template graphics using the graphics engine 222. Thereafter, the super-user assigns positions for the component graphics on the template graphic. The component graphics are graphics of the corresponding components, such as the disk drive, the CD drive, and the monitors. The template graphic corresponds to the whole computer. Therefore, the graphic report to be produced for the solution would display selected components on a computer, such as the relative size and position of a processor, a disk drive, or a CD drive in the computer. Each component has an associated component graphic.

The super-user then creates selections for the solution tool 226. These selections are a series of questions that are to be answered with selectable options. For example, a first question may request what kind of drive is required for the computer. Options may include a disk drive, a CD drive, or both a disk drive and a CD drive.

The super-user then creates logic rules 220 using a rules engine. The logic rules include logic statements that determine components that will be required for a solution based upon options selected for questions. For example, if a disk drive is selected as an option, the computer will require a driver for the disk drive.

Once the super-user has created the solution tool 226, the super-user makes the solution tool active. The solution tool 226 then shall reside on the solution system database 214.

In another example, a user using the user system 208 connects through the user interface 206 to the downloadable database 216 through the solution system database interface 212. When the user system 208 has connected to the downloadable database 216, the SCS code 238 automatically determines, via the downloadable database 216, if the user system 208 has an interpreter 228 and if the user system has the current versions of any solution tools. In this example, the user system 208 does not have an interpreter. Therefore, the downloadable database 216, as governed by the SCS code 238, prompts the user system 208 to download the interpreter 228. The user system accepts the download, and the interpreter 228 automatically is downloaded to the user system 208 from the solution system database 214 via the downloadable database 216. In this example, no solution tools residing on the user system 208 require updating.

The user system 208 is provided a list of available solution tools. The user system 208 selects the solution tool 230 for download. The SCS code 238 initiates transfer of the solution tool 230 via the downloadable database 216 to the user system 208.

The interpreter 228 on the user system 208 converts the solution tool 230 to an executable solution tool. In this example, the interpreter 228 automatically converts the solution tool 230 to JAVA interpreted solution tool code 232. The interpreted solution tool code 232 contains the JAVA executable code and all of the graphics, including component graphics and template graphics that may be required for any potential solution to the solution tool. Additionally, the interpreted solution tool code 232 has the component listing of all components that may be required for any potential solution and hyperlinks to media for any component, template graphic, or component graphic. Also included is the on-line help.

The user uses the interpreted solution tool code 232 to determine requirements for a solution. The interpreted solution tool code 232 generates solution selections 234, including questions to be answered by the user and options that may be selected for the questions. While the user is selecting options to the questions, the interpreted solution code 232 dynamically builds the solution requirements 236. In this example, the solution requirements 236 include a component list report, a graphic report and hyperlinks to media for training. It will be appreciated that in other examples, one or more of the component list report, the graphic report, and the hyperlinks to training may be excluded.

The user completes the solution selection 234, and the interpreted solution code 232 finalizes the solution requirements 236. Thereafter, the solution to the solution tool 230 is complete. The user of the user system 208 then may upload the finalized solution back to the solution system database 214 via the user interface 206, the solution system database 212, and the downloadable database 216. The solution may be uploaded in any convenient format, such as in a word processing document or a spreadsheet document. Once uploaded to the solution system database 216, the solution can be shared by other users or parsed to any system. For example, the uploaded solution can be formatted and sent to a system to generate an order for installation of the required components for the solution.

Figure 3:
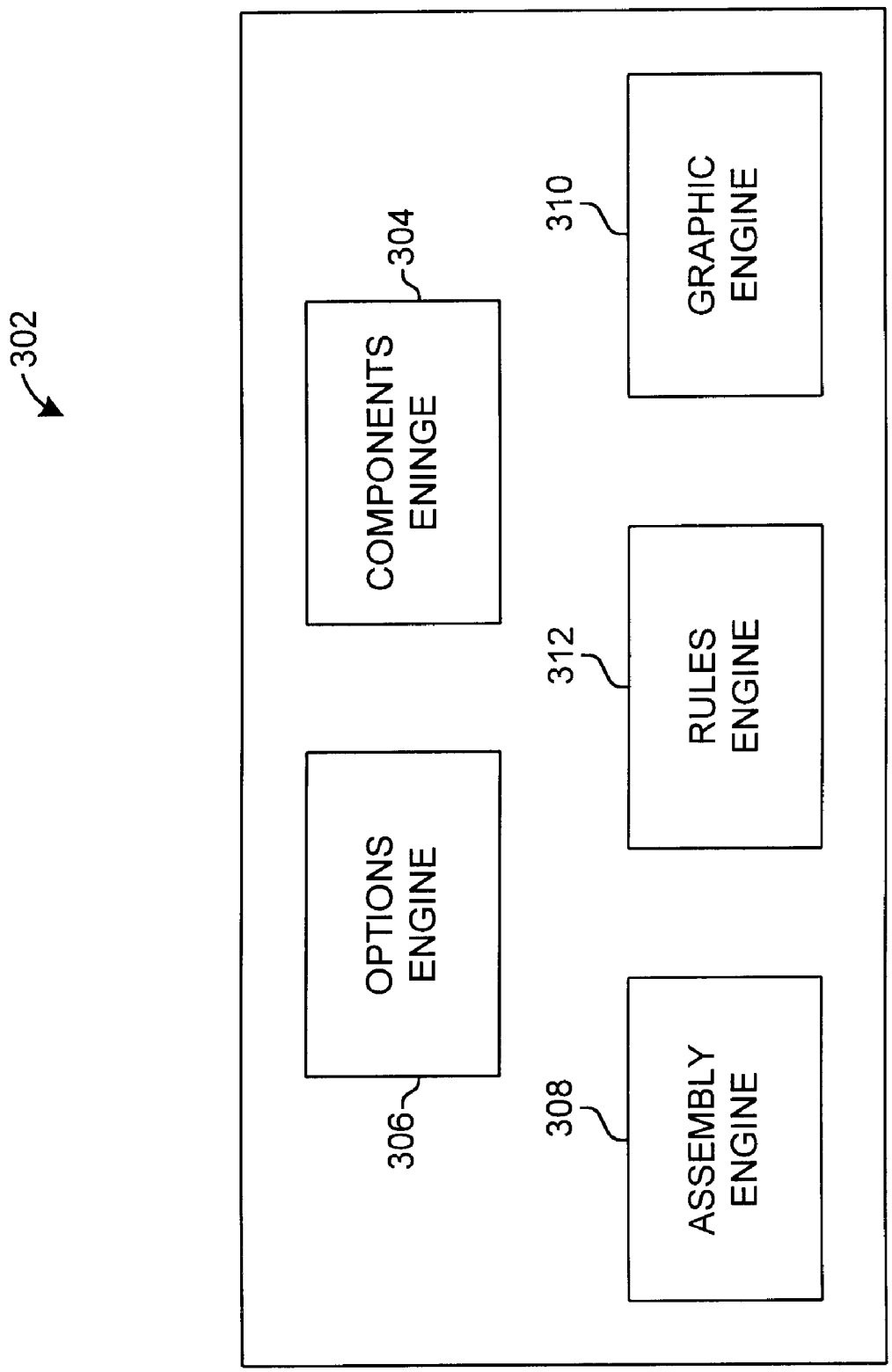
FIG. 3 is a block diagram of a solution tool creator in accordance with an embodiment of the present invention.

FIG. 3 depicts an exemplary embodiment of a an STC 302. The STC 302 comprises a components engine 304, an options engine 306, an assembly engine 308, a graphic engine 310, and a rules engine 312.

The components engine 304 are a list of items needed for any potential solution to a solution tool. Based upon options selected for questions, required components will be specified for a solution. For example, for a solution tool created to determine what items are required for installing a particular telecommunication switch, the components are cards, power supplies, fans, power components, power specifications such as the amount of current and voltage required, cords, connections, and all other items needed to install the telecommunication switch in one or more locations.

The options engine 306 comprise questions and options. The options engine 306 include components selected as options or other components entered as text entries for answers to questions.

The assembly engine 308 stores information about potential solutions to a solution tool. The assembly engine 308 assigns properties for components, creates variables for options, creates a base list of standard components needed for any potential solution to a solution tool, and creates lookup reference categories and a glossary of terms for any potential solution.

The graphic engine 310 creates graphics for each component and adds informational detail, such as descriptions, position, and size for a component, the associated component graphic, and template graphics. Properties for each component graphic and other associated component graphics to be included with the component are defined with the graphic engine 310.

The rules engine 312 creates logic rules for formulating a solution tool and logic statements associated with each component. The logic statements are based upon questions developed for implementing any potential solution, such as a device, and the restrictions associated with a particular component when used in conjunction with other components.

The rules engine 312 is a point-and-click control pad with logic buttons that allows a super-user to create the logic rules that determine requirements for a solution based upon components for a solution tool and selected options to questions in a solution tool. The rules engine has a base set of logic buttons with operators that can be used to create any logic statements or rules needed to implement any solution tool. The logic statements and logic rules are created by clicking on logic buttons, components listed in the component list, and graphics.

Once the logic rules and logic statements are created, the rules engine dynamically converts the created logic rules to assembled logic in a assembled logic format that can be used to complete a solution tool. The logic rules are saved as part of the created solution tool in the assembled logic format.

Figure 4:
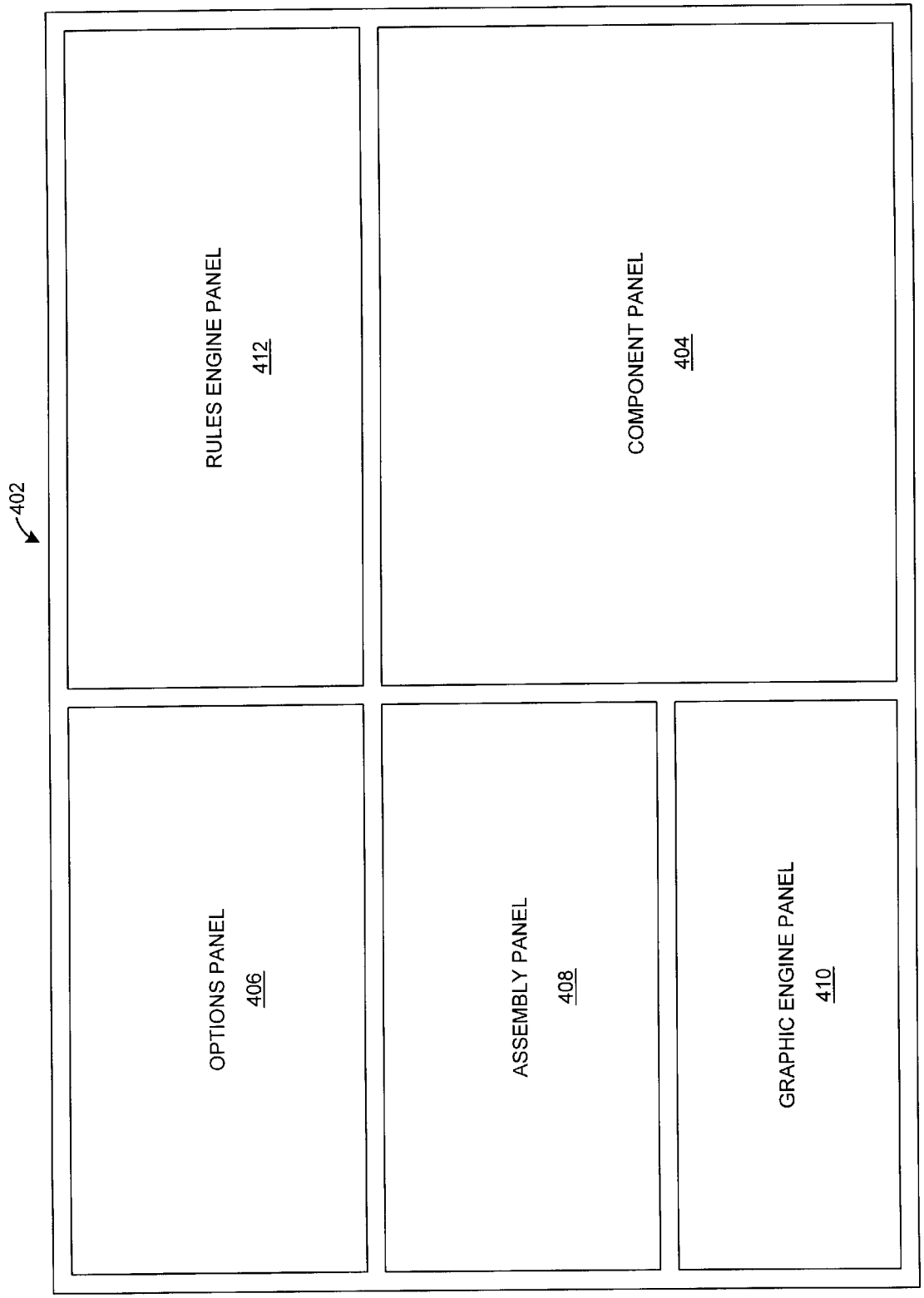
FIG. 4 is a block diagram of a solution tool creator in accordance with an embodiment of the present invention.

FIG. 4 depicts an exemplary embodiment of a screen display for an STC 402. The STC 402 comprises a component panel 404, an options panel 406, an assembly panel 408, a graphic engine panel 410, and a rules engine panel 412.

The component panel 404 is used to create a list of components, such as hardware, tools, processes, or other resources needed for any potential solution to the solution tool being created. The component panel 404 allows a super-user to enter a component identification (ID) for each component listed. The component panel 404 has a search function that allows a super-user to search for and locate a component listed in the component list.

The options panel 406 is used to build the selections and to manipulate the order and series of the selections. The options panel 406 is used to create questions outlining requirements for potential solutions to a solution tool. For each question created, options are generated that can be selected by a user of the solution tool. The order in which a question follows another question or options to questions are presented to a user of a particular solution tool are defined using the options panel 406.

The assembly panel 408 is used to store information about potential solutions to a solution tool. The assembly panel 408 is used to define properties for components, create variables for options, create a base list of standard components needed for any potential solution to a solution tool, and create lookup reference categories and a glossary of terms for any potential solution.

The graphic engine panel 410 is used to create graphics for each component and to add informational detail, such as description, position, and size for a component, the associated component graphic, and template graphics. Properties for each component graphic and other associated component graphics to be included with the component can be defined with the graphic engine panel 410.

The rules engine panel 412 is used to create logic rules for formulating a solution tool and logic statements associated with each component. The logic statements are based upon questions developed for implementing any potential solution, such as a device, and the restrictions associated with a particular component when used in conjunction with other components.

The system of FIG. 4 works as follows. A super-user uses the STC 402 to create a solution tool. The super-user defines a list of components in the component panel 404 that may be required for any solution to the solution tool. Questions are created in the options panel 406 that, when answered by a user with selected options, allow assembled logic rules to determine the requirements needed for a solution to the solution tool. One or more options are created for each of the questions.

The super-user uses the assembly panel 408 to define a base list of standard equipment needed for any potential solution and properties for each of the components.

The super-user then uses the graphic engine panel 410 to create component graphics for each component and a template graphic for the total solution on which the component graphics may be placed when the associated components are selected for the solution requirements. In addition, the graphic engine panel 410 is used to specify particular components that shall be included in a solution when a parent component is selected by a user. As used herein, the term "parent component" means a component that, when selected, triggers the automatic selection and inclusion of other components in a solution to a solution tool.

The super-user then uses the rules engine panel 412 to define logic rules for selecting particular components to be used within a particular solution based upon selections made by a user to questions. In addition, the rules engine panel 412 is used to build logic rules defining the placement and order of component graphics to be used in a particular solution. For example, the rules engine panel 412 can be used to design logic rules that select a second of two component graphics to be placed on a template graphic in a certain location based upon a user's selected option to a question.

FIGS. 5–20 illustrate exemplary embodiments of panels used with an STC. In the examples of FIGS. 5–20, a solution tool to determine the requirements for a hypothetical telecommunication switch is being created. Some of the FIGS. 5–20 include information depicting a hypothetical telecommunications switch.

FIG. 5 depicts an exemplary embodiment of a component panel 404A having a component list. The component list of FIG. 5 comprises a short description 502 and a long description 504. The short description 502 can be used in a graphic display as a short form. The long description 504 can be used as a "mouse over" that displays the long description when a mouse cursor is placed on or near a component or a component graphic displaying the short description. The long description 504 also may be used in other portions of the system requiring a user or a super-user to have a better description of a component. The short description 502 mainly is used as a short term component identification (ID).

FIG. 6 depicts an exemplary embodiment of an options panel 406A. The options panel 406A comprises a questions panel 602 and an option selections panel 604.

The questions panel 602 is used to enter questions that, when answered by a user with options, allow the system to process the options to determine requirements for a particular solution to the solution tool. When a question is added or at any time during the creation and building process, the sequence in which the questions are presented to a user are defined. The question number, the default next question number, and the question type, i.e. text or option list, are defined. The text type allows a user to enter a text entry. The option list type defines the question as having selectable options from the options panel. Any question can be edited at any point after its entry.

The option selections panel 604 is used to define one or more options that may be selected as an answer to each question entered in the questions panel 602. For example, a first question specified in the questions panel 602 may have a corresponding 5 entered options that may be selected as answers in the options selection panel 604. The options can be defined as presented in any sequence order, with a particular option following or preceding another option when displayed to a user. In addition, the options may be edited at any time after their entry.

FIGS. 7–12 depict an exemplary embodiment of an assembly panel 408A. The assembly panel 408A of FIGS. 7–12 has a series of navigation tabs that allow the super-user to enter, modify, and view related information for components and component graphics.

FIG. 7 depicts an exemplary embodiment of an assembly tab 702 of the assembly panel 408A. The assembly tab enables entry of a description for the solution tool itself. Other information regarding the solution tool as a whole may be entered in the assembly tab 702. For example, the product description of a device for which configuration and implementation is required and for which solution requirements are to be determined can be entered.

FIG. 8 depicts an exemplary embodiment of an add ons tab 802 for the assembly panel 408A. The add ons tab 802 enables entry of details and information associated with components and associated with the total assembly of the components. The add ons tab 802 has a component add on panel 804 and an assembly add on panel 806.

The component add on panel 804 is used to enter supplementary information for a particular component beyond the default information that can be entered in the component panel 404 (see FIG. 5). Thus, component properties such as the type of the component, including text, number, or yes/no, a default value such as yes if the type is yes/no, a description of the component, and an alias name for the component if the component is referred to by a different name. A component can be added, edited, deleted, or built using the component add on panel 804. In the example of FIG. 8, the component "size" is defined as having a type of number.

The assembly add on panel 806 allows entry of supplementary information regarding the assembly of the solution tool. The assembly add on panel 806 enables entry of an assembly add on name, a type for the name such as text, number, or yes/no, a default value for the assembly add on, and a description and alias for the assembly add on. An assembly add on may be added, edited, deleted, or built using the assembly add on panel 806.

FIG. 9 depicts an exemplary embodiment of a variants tab 902 for the assembly panel 408A. The variants tab 902 enables assigning a category name to one or more outcomes that may be selected as a selection from the options panel 406 (see FIG. 6). For example, a question and options for the question may be created using the options panel 406. In this example, the selection of the second of the options when answering the question can be saved as an option variant by naming the outcome with a name in a name panel 904 and attaching the category to the name in the category panel 906. In the example of FIG. 9, a question regarding whether network redundancy is required would allow an option for a yes or a no. Thus, an option variant named network redundancy is created in the name panel 904, and a category of yes/no is attached to the name in the category panel 906. A default value can be attached to the variant name. The variant option then is set with relation to the question and the option for which the variant option was selected. Thereafter, the variant option will be associated with the question and the option for which it was created.

Figure 10:
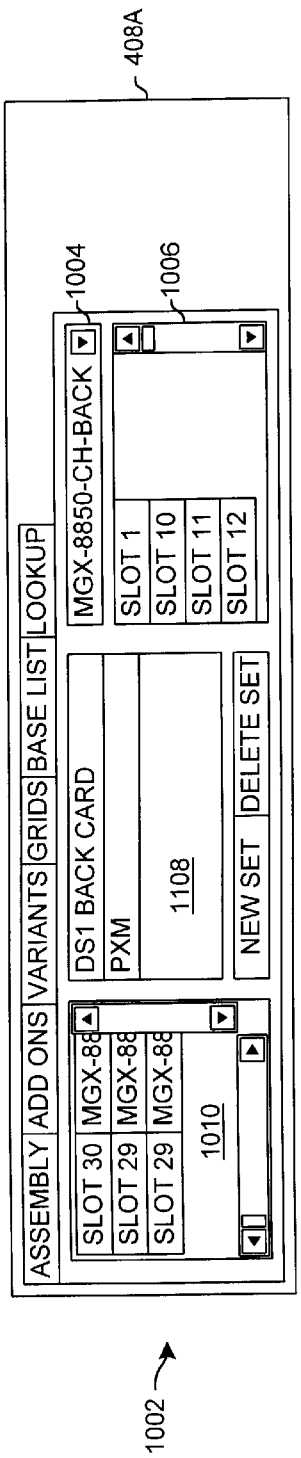
FIG. 10 is a screen display of an assembly panel of the solution tool creator of FIG. 4 with a grids tab.
Figure 16:
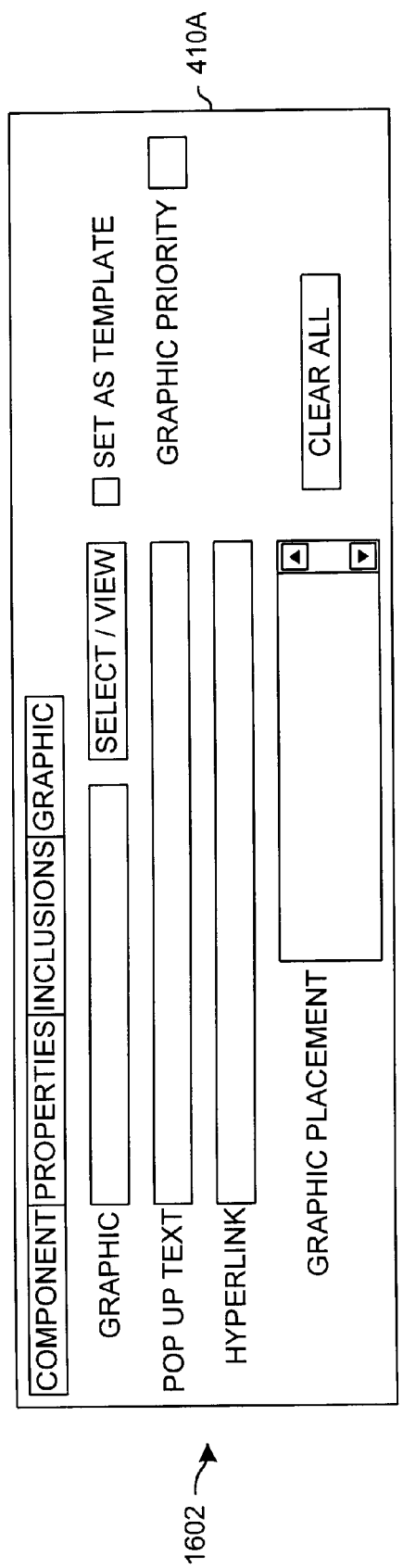
FIG. 16 is a screen display of a graphic engine panel of the solution tool creator of FIG. 4 with a graphic tab.

FIG. 10 depicts an exemplary embodiment of a grids tab 1002 for the assembly panel 408A. The grids tab 1002 is used to designate the positions and the order of component graphics and template graphics. The grids tab 1002 is used in conjunction with the graphic tab of the graphic engine panel (see FIG. 16). A component first is selected from the component panel 404A (FIG. 5), the graphic placement box in the graphic engine panel is selected (FIG. 16), and a template that corresponds to the selected component is selected from the template selection panel 1004 of the grid tab 1002 of the assembly panel 408A. A list of available locations on the template, such as slots in the example of FIG. 10, will be listed in the position view panel 1006. Once a template position has been selected, the template position will appear in the graphic placement box of the graphic tab in the graphic engine panel (FIG. 16).

Graphic sets can be created that assign component graphics positions on a template graphic, assign the order in which the component graphics can fill the positions, specify if particular component graphics have priority to fill a position over another component graphic, and identify the priority order of the particular component graphics. A graphic set is created by selecting the graphic set panel 1008, entering the name of the graphic set to be created, selecting a template graphic from the template selection panel 1004, and selecting from the position view panel 1006 the positions that a component graphic can fill and the order in which the component graphic can fill the selected positions. The component graphics with their assigned positions are listed in the position assignment panel 1010. Graphic sets can be created or deleted by using the new set and delete set buttons, respectively.

Figure 11:
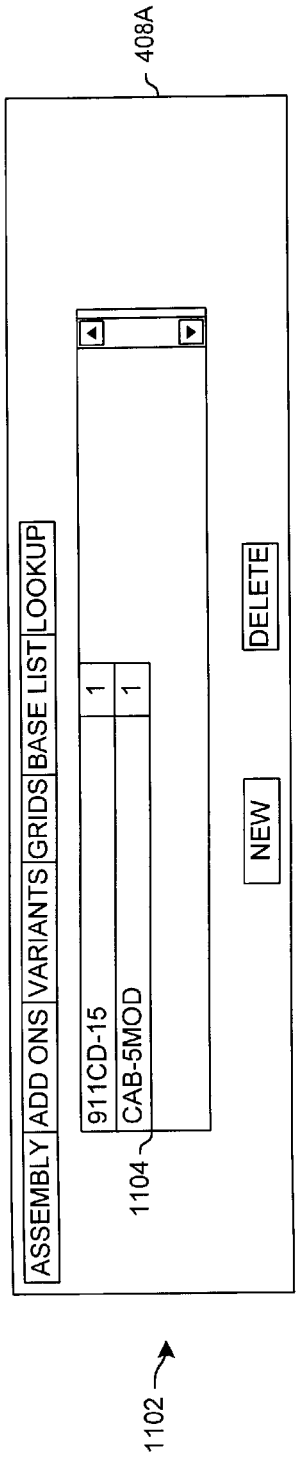
FIG. 11 is a screen display of an assembly panel of the solution tool creator of FIG. 4 with a base list tab.

FIG. 11 depicts an exemplary embodiment of a base list tab 1102 for the assembly panel 408A. The base list tab is used to create a list of components, processes, tools, or other resources that will be standard for a whole solution tool. An item is added to a base list by selecting the new button in the base list panel 1102, selecting a component from the component list in the component panel (FIG. 5), and specifying the number of the items to be included in the base list. The component and the number of the components to be included in the base list are identified in the included component panel 1104.

Figure 12:
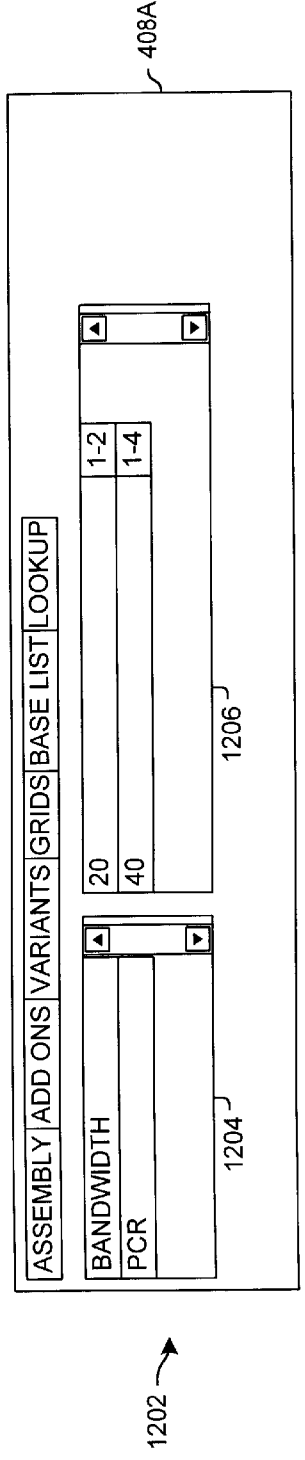
FIG. 12 is a screen display of an assembly panel of the solution tool creator of FIG. 4 with a lookup tab.

FIG. 12 depicts and exemplary embodiment of a lookup tab 1202 for the assembly panel 408A. The lookup tab 1202 is used to create one or more lookup tables. The name of the lookup table is entered in the table identification (ID) panel 1204. Reference information about the lookup table is entered in the table information panel 1206.

Figure 13:
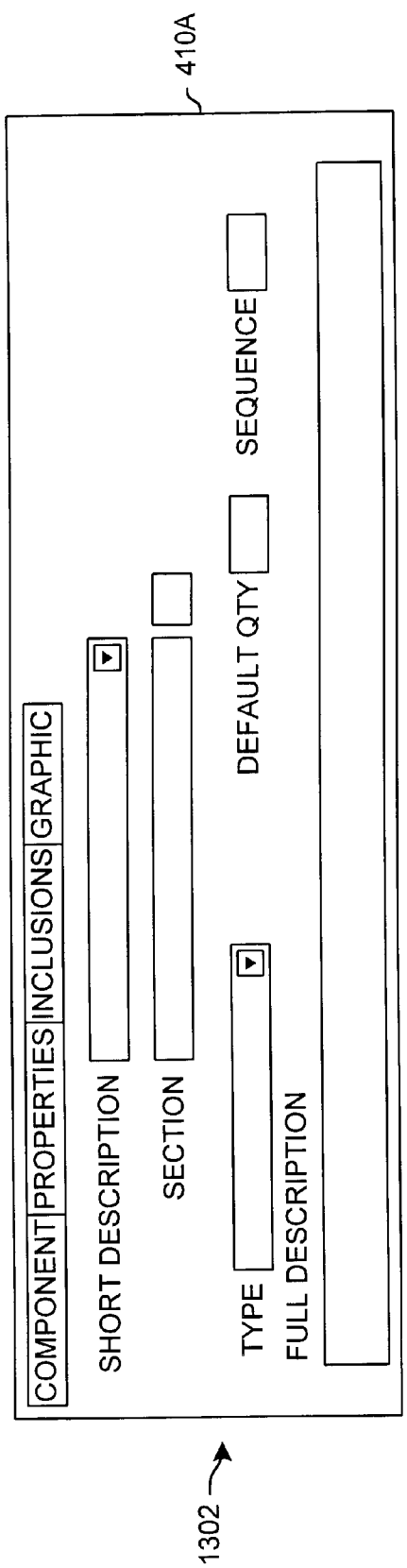
FIG. 13 is a screen display of a graphic engine panel of the solution tool creator of FIG. 4 with a component tab.

FIG. 13 depicts an exemplary embodiment of a component tab 1302 for the graphic engine panel 410A. The component tab is used to identify component information for the solution component list report (see FIG. 25). The component information can be sequenced into sections on the report, and the type of the component is identified for the component list report. The component information may include a full description, a component type such as graphic, text, or another type, the default quantity for the number of the particular components that are needed for a solution, and a sequence for which the components of a section are to be placed in sequential order. A section box is used to categorize components for a component list report. A section number box on the right of the section box is used to define the sequence in which the sections are placed.

Figure 14:
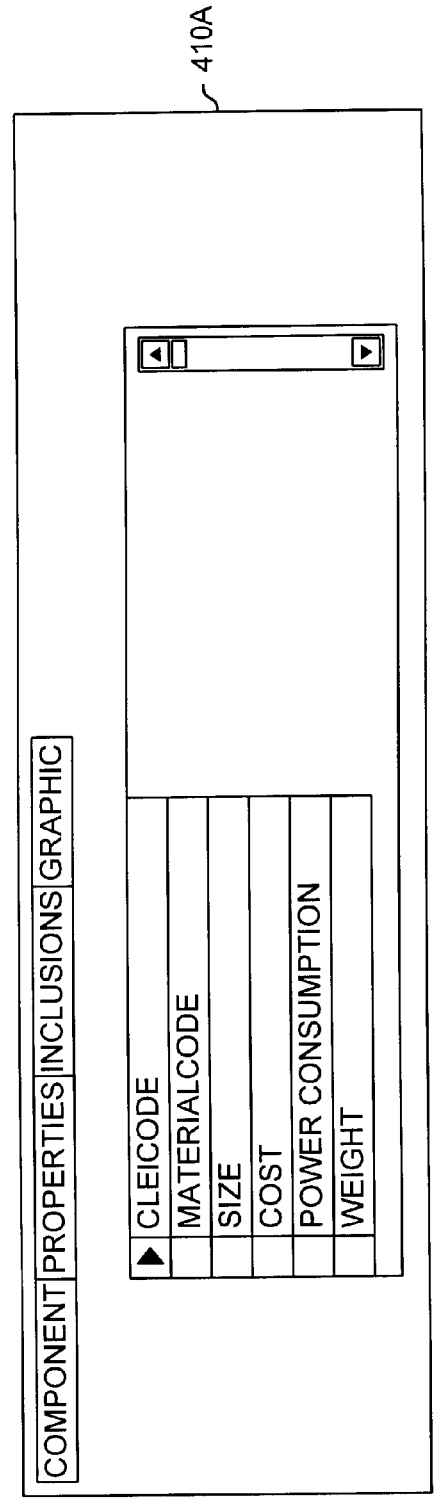
FIG. 14 is a screen display of a graphic engine panel of the solution tool creator of FIG. 4 with a properties tab.

FIG. 14 depicts an exemplary embodiment of a properties tab 1402 for the graphic engine panel 410A. The properties tab 1402 is used to create a value that corresponds to add ons that are defined in the add ons tab 802 of the assembly panel 408A (see FIG. 8). When used, components are listed in the properties tab 1402. A component is selected. The user then is displayed a box (not shown) with the component short description and the add on for the component. The value for the component then can be entered.

Figure 15:
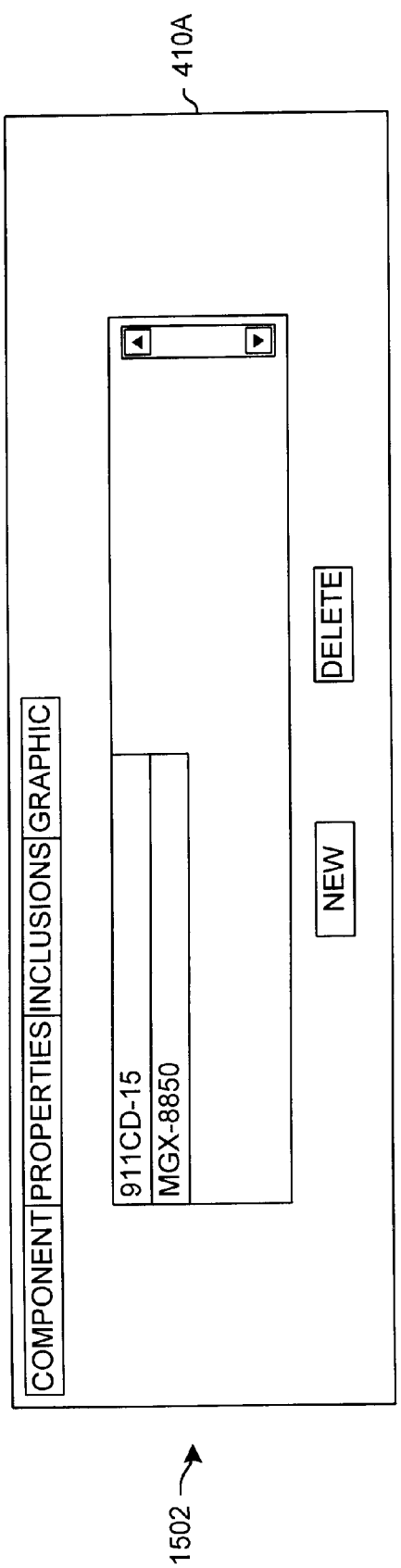
FIG. 15 is a screen display of a graphic engine panel of the solution tool creator of FIG. 4 with an inclusions tab.

FIG. 15 depicts and exemplary embodiment of an inclusions tab 1502 for the graphic engine panel 410A. The inclusions tab 1502 is used to define components that are automatically included in a solution when a parent component is selected. To use the inclusions tab 1502, a parent component is selected from the component list of the component panel 404A (see FIG. 5). Then, in the inclusions tab 1502, the new button is selected. Additional components then are selected from the component panel 404A to assign the included components.

FIG. 16 depicts an exemplary embodiment of a graphic tab 1602 for the graphic engine panel 410A. The graphic tab 1602 is used to add component graphics to components for inclusion in a solution graphic report. The graphic tab 1602 is used by selecting a component from the component list of the component panel 404A (see FIG. 5). The selected component then is listed in the pop up text box in the graphic tab 1602. The select/view button 1604 can be used to open a graphic build window (see FIG. 17). The name of the component is displayed in the pop up text box, the component graphic name or template graphic name is displayed in the graphics box, and any hyperlink assigned to the component graphic or template graphic is displayed in the hyperlink box. If the graphic is to be a template graphic, the "set as template" check box will be selected. A graphic with its associated position is displayed in the graphic placement box, and the graphic priority is entered in the graphic priority box.

Figure 17:
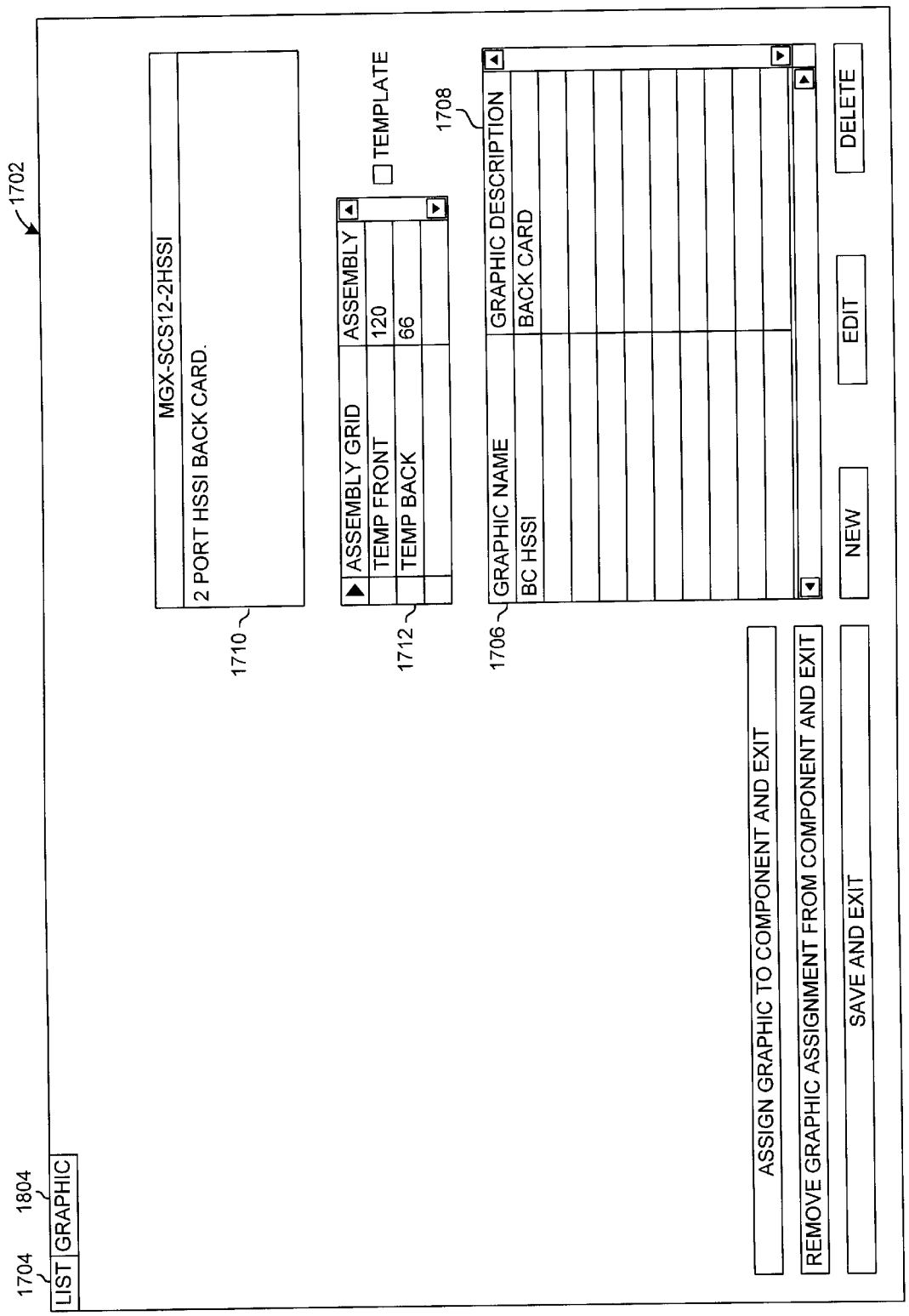
FIG. 17 is a screen display of a graphic build window of the solution tool creator of FIG. 4 with a list tab.

FIG. 17 depicts an exemplary embodiment of a graphic build window 1702. The graphic build window 1702 is used to create and build component graphics and template graphics. After a component is selected from the component panel 404A (see FIG. 5), and the select/view button 1604 is selected from the graphic tab 1602 of the graphic engine panel 410A (see FIG. 16), the graphic build window 1702 is displayed with the list tab 1704. The component and its assigned graphics are displayed in the graphic name and graphic description boxes.

A new component graphic can be created or assigned to a component by selecting the new button and entering the name, description, and graphic file name for the component graphic. The component graphic then will appear in the graphic build window 1702 with its name and description displayed in the graphic name and graphic description boxes 1706 and 1708.

The name of the associated component and its description are displayed in the component graphic list box 1710. The component graphic is assigned to the component by selecting the "assign graphic to component and exit" button. The "remove graphic assignment from component and exit" button can be used to exit the graphic build window 1702 without saving the graphic assignment. Graphic assignments may created, edited, or deleted with the new, edit, and delete buttons.

A template graphic may be assigned to a component by selecting a component template from the component list 404A (see FIG. 5). After the "set as template" check box is checked and the graphic tab 1602 (see FIG. 16), and the select/view button 1604 is selected, the graphic build window 1702 is displayed. Since the "set as template" box was checked in the graphic tab 1602, the position name of the component appears in the assembly grid box 1712 which list the names of assigned positions on the template graphic. The template graphic name and description appear in the graphic name and graphic description boxes 1706 and 1708. A description of the template graphic and its requirements are listed in the component graphic list box 1710.

Figure 18A:
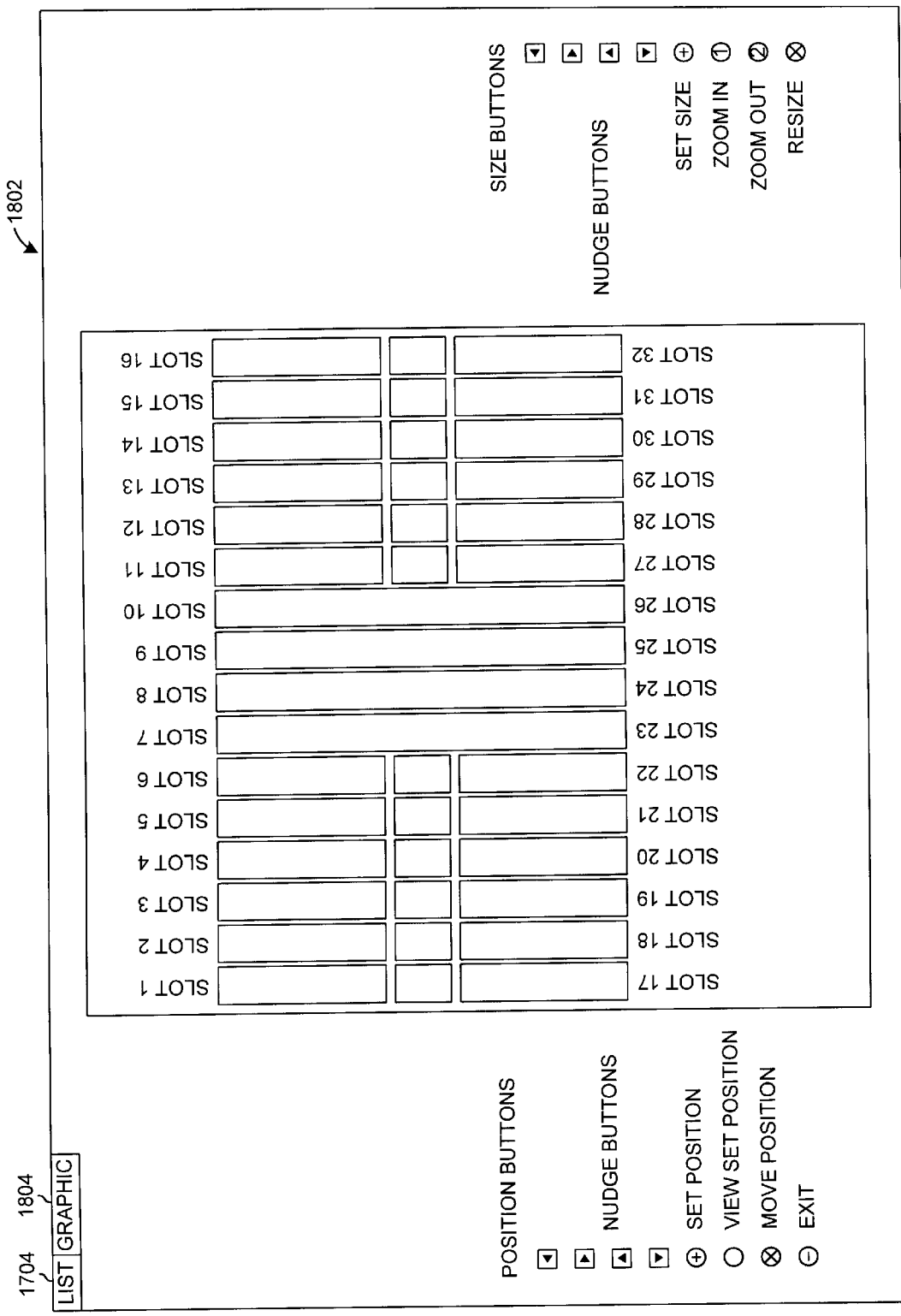
FIG. 18A is a screen display of a graphic build window of the solution tool creator of FIG. 4 with a graphic tab.

FIG. 18A depicts an exemplary embodiment of a graphic developer window 1802 used in conjunction with the graphic build window 1702 of FIG. 17. The graphic developer window 1802 is used to set template graphic and component graphic size and position. The example of FIG. 18A depicts a telecommunications switch. However, other graphics may be used for other examples.

The graphic developer window 1802 has position buttons including left, right, up, and down nudge buttons, a set position button, a view position button, a move position button, and an exit button. The graphic developer window 1802 also has size buttons including left, right, up, and down nudge buttons, a set size button, a zoom in button, a zoom out button, and a resize button.

To use the graphic developer window 1802, the template graphic that is to be sized and/or positioned is selected from the assembly grid box 1712, and its associated component graphic name is selected in the graphic name box 1706 (see FIG. 17). The template box to the right of the assembly grid box 1712 is checked, and the graphic tab 1804 is selected.

The template size can be adjusted by using the nudge buttons, the zoom in button, and the zoom out button. The set size button is used to save the size of the template. The resize button is used to readjust the size of the template.

To move the position of the template, the move position button is selected. Thereafter, the template can be moved by selecting it and dropping it at the desired location. The nudge buttons can be used to move the template slightly in any direction, and the set position button is used to save the position of the template. The view set position button is used to view a finally set position.

Figure 18B:
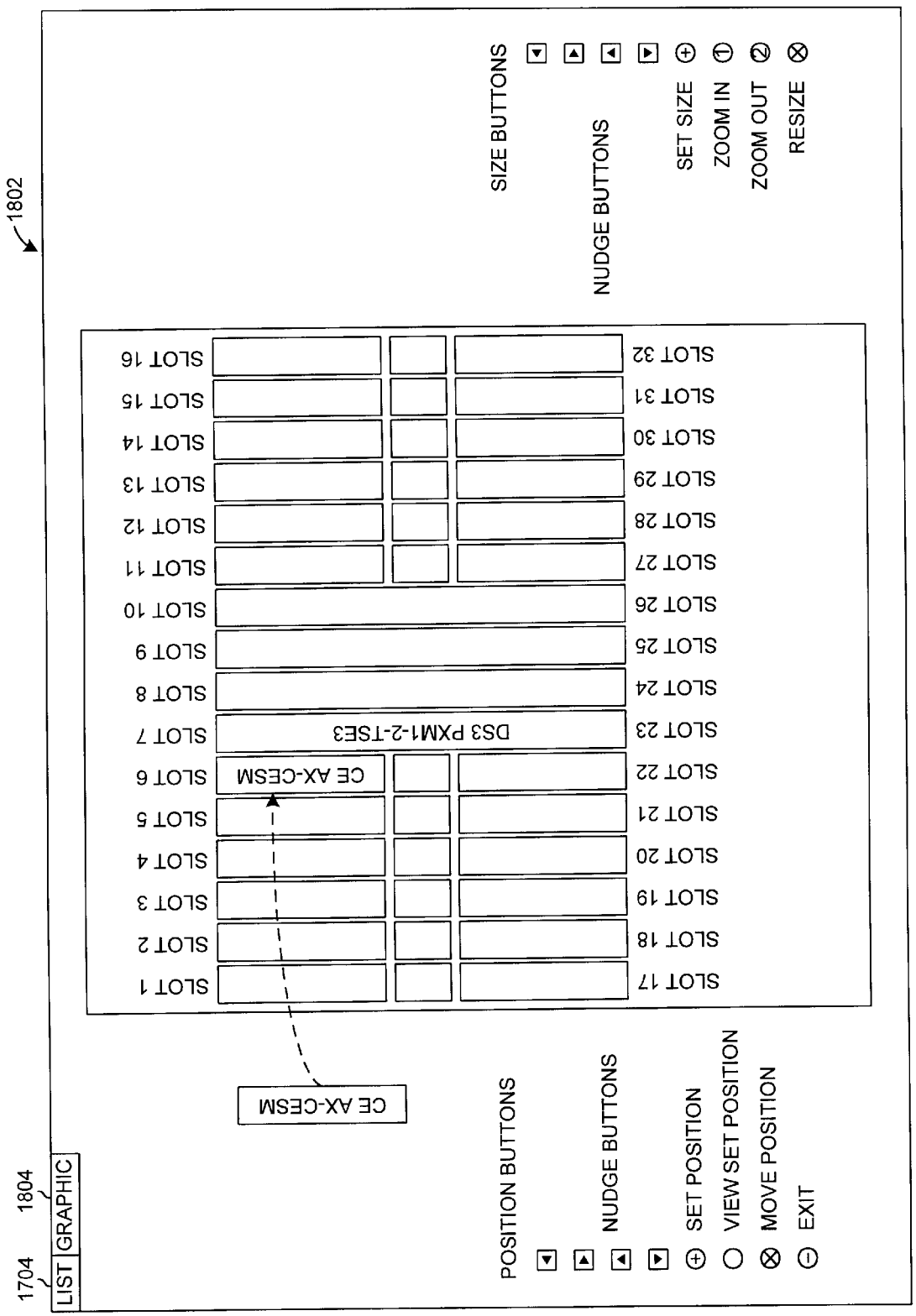
FIG. 18B is a screen display of a graphic developer window of the solution tool creator of FIG. 4 with a graphic tab.

FIG. 18B depicts an example of a component graphic with a template graphic in the graphic developer window 1802. The size and position of a component graphic can be set by selecting the component graphic in the graphic name box 1706 in the graphic build window 1702 (see FIG. 17), and selecting the graphic tab 1804. The component graphic and its associate template graphic are displayed.

The size and position of the component graphic are set using the size buttons and the position buttons as described above. For example, the component graphic is positioned within the template graphic by selecting the component graphic, moving the component graphic to the desired location within the template graphic, and dropping the component graphic. The location of the component graphic is saved by selecting the set position button. At this point, the template position is entered in a text box (not shown), such as slot 6 for this example. All of the positions that have been set for component graphics within the template graphic can be viewed by selecting the view set positions button.

Figure 19:
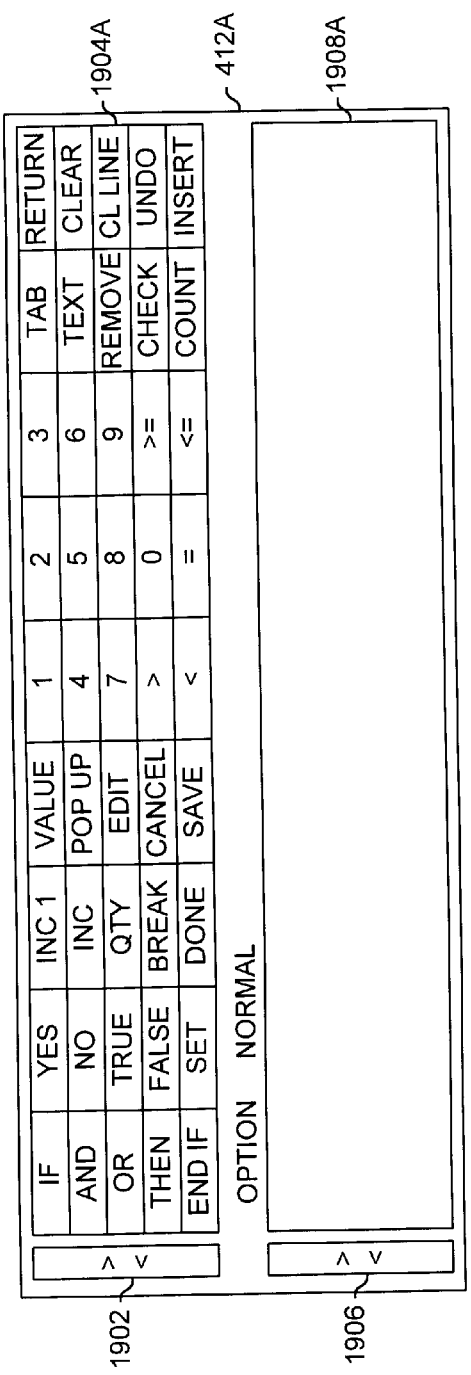
FIG. 19 is a screen display of a rules engine panel interface for rules engine panel of the solution tool creator of FIG. 4.
Figure 20:
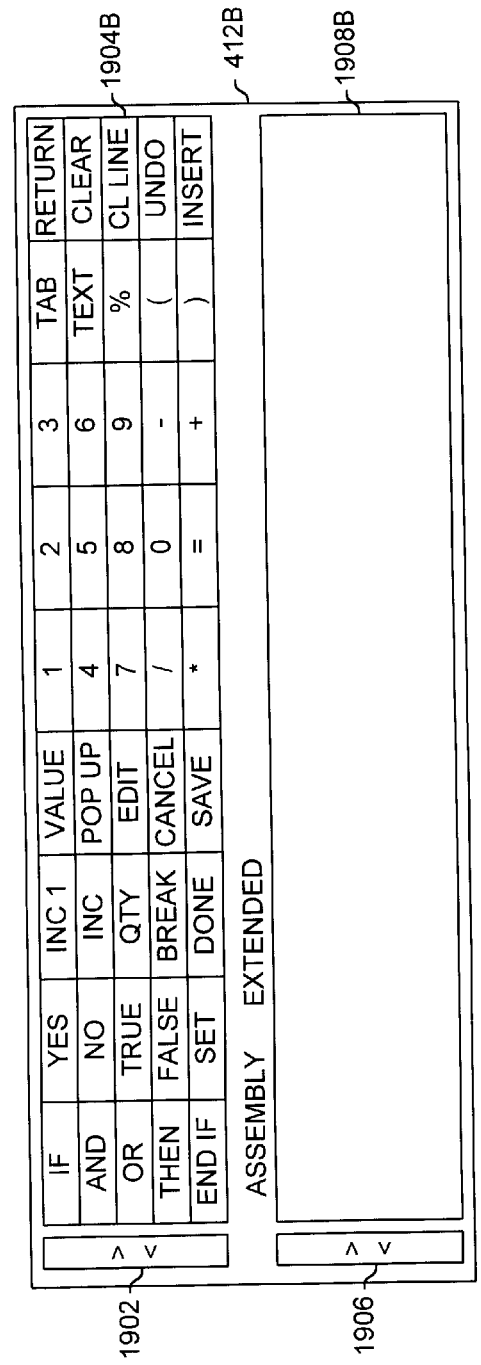
FIG. 20 is a screen display of another rules engine panel interface for the rules engine panel of the solution tool creator of FIG. 4.

FIGS. 19–20 depict an exemplary embodiment of rules engine panels 412A and 412B. The rules engine panels 412A and 412B have a control pad toggle 1902 used to toggle between the control pad 1904A depicted in FIG. 19 and the control pad 1904B depicted in FIG. 20. The rules engine panels 412A and 412B also have a window toggle 1906 used to toggle between the option window 1908A of FIG. 19 and the assembly window 1908B of FIG. 20.

The control pads 1904A and 1904B have logic buttons with operators used to create logic rules for formulating solution tools using logic statements associated with each component. The logic statements and logic rules are displayed upon their creation in the option window 1908A and the assembly window 1908B.

The option window 1908A is used to display logic rules created for options, such as those displayed in the options panel 406 (see FIG. 4). Examples of logic rules displayed in the option window 1908A are described below.

The assembly window 1908B is used to display logic rules created for assembling a whole solution tool. For example, after all of the selections to options are made for a solution tool, and over (x) number of a particular component are selected as options, a different component may be required for the solution. Thus, in the assembly window 1908B, logic rules are created that are directed toward including that different component if over (x) number of particular components are selected. The logic rules created in the assembly window 1908B are directed to the overall design of the solution and the solution tool.

The logic buttons on the control pads 1904A and 1904B are used for creating rules and defining logic. The SET button is used to set a variable. The BREAK button marks the end of a single command. The BREAK/RETURN sequence of buttons marks the end of a single command and starts a new line. The DONE button marks the end of an entire rule. The EDIT button allows a question, option, or component solution to be edited. The CANCEL button is used to clear all work without saving the work. The SAVE button saves the logic rule. The INC I button adds one to the quantity of the selected component if the component already is listed within the rule, or, if the component is not listed within the rule, adds the component and sets the quantity of the component to one. The INC button adds (x) number to the quantity of the component or, if the component is not listed, adds the component and sets the quantity of the component to (x).

The QTY button adds the component and sets the total number of components to (x). The VALUE button provides a pop up window in which the value for the component may be entered. The CLR ALL button deletes a whole entry. The CLR LINE button deletes the current line. The UNDO button will undo the last thing entered. The INSERT button will insert a line above a selected line. The TEXT button allows entry of text. All other buttons are used in creating a rule.

Referring to FIGS. 4, 19, and 20 the rules engine panels 412A and 412B are used as follow. A question and an option are selected in the option panel 406, and a component that corresponds to the question/option combination is selected in the component panel 404. The component then is displayed in the assembly window 1908B of the rules panel 412B preceded by the word ADD to indicate that the component has been added to a solution for which the option to the question would be selected. The BREAK, DONE, and SAVE buttons then are selected in the control pad 1904A to indicate that the logic rule for this question/option combination is complete.

Option variants may be set as follows. A question/option combination is selected in the options panel 406, and the SET button is selected in the control pad 1904A. A variable is selected in the options variants tab of the assembly panel 408. The equal button is selected in the control pad 1904B, and the VALUE button is selected in the control pad 1904A. A pop up window is displayed, and the value for the variable can be entered. The BREAK, DONE, and SAVE buttons then are entered in the control pad 1904A to save the variable for the solution. At this point the option window 1908A displays the sequence as SET variable=value BREAK DONE SAVE.

Logic rules can be defined for option variants as if/then rules. If/then logic rules can be created as follows. The EDIT and IF buttons of the control pad 1904B are selected. An option variant that corresponds to a question/option combination is selected from the option variant tab in the assembly panel 408B. The equal and VALUE buttons from the control pad 1904B are selected, and the value corresponding to the variable is entered. The THEN button of the control pad 1904B is selected, and a component from the component panel 404 is selected. Then the BREAK and RETURN buttons are selected in the control pad 1904B. The resulting rule is displayed in the option window 1908A.

Other logic rules may be created using the control pads 1904A and 1904B. One skilled in the art will understand how the buttons in the control pads 104A and 104B can be used to create logic rules and logic statements for a solution tool.

Figure 21:
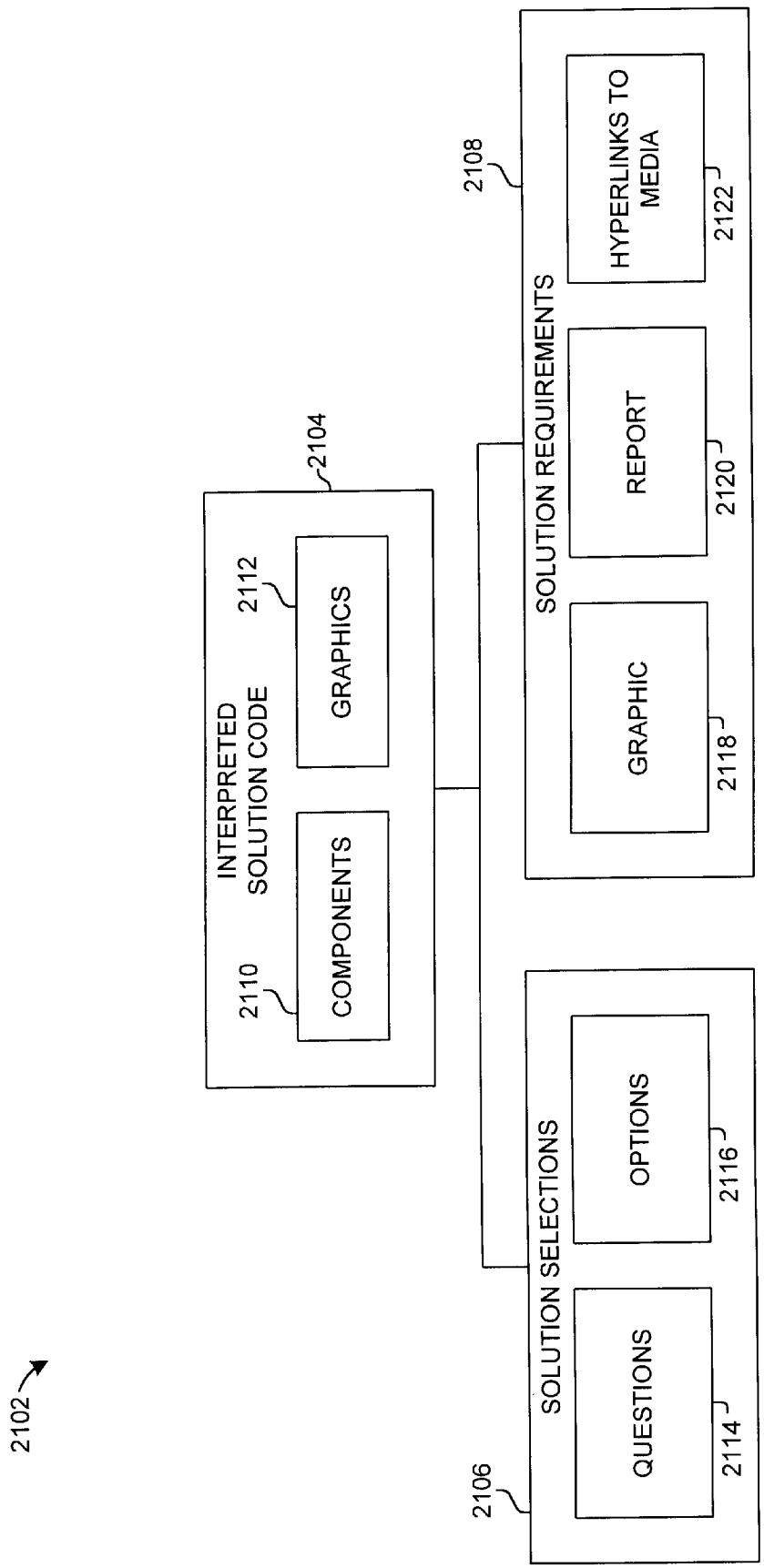
FIG. 21 is a block diagram of a solution tool in accordance with an embodiment of the present invention.
Figure 22:
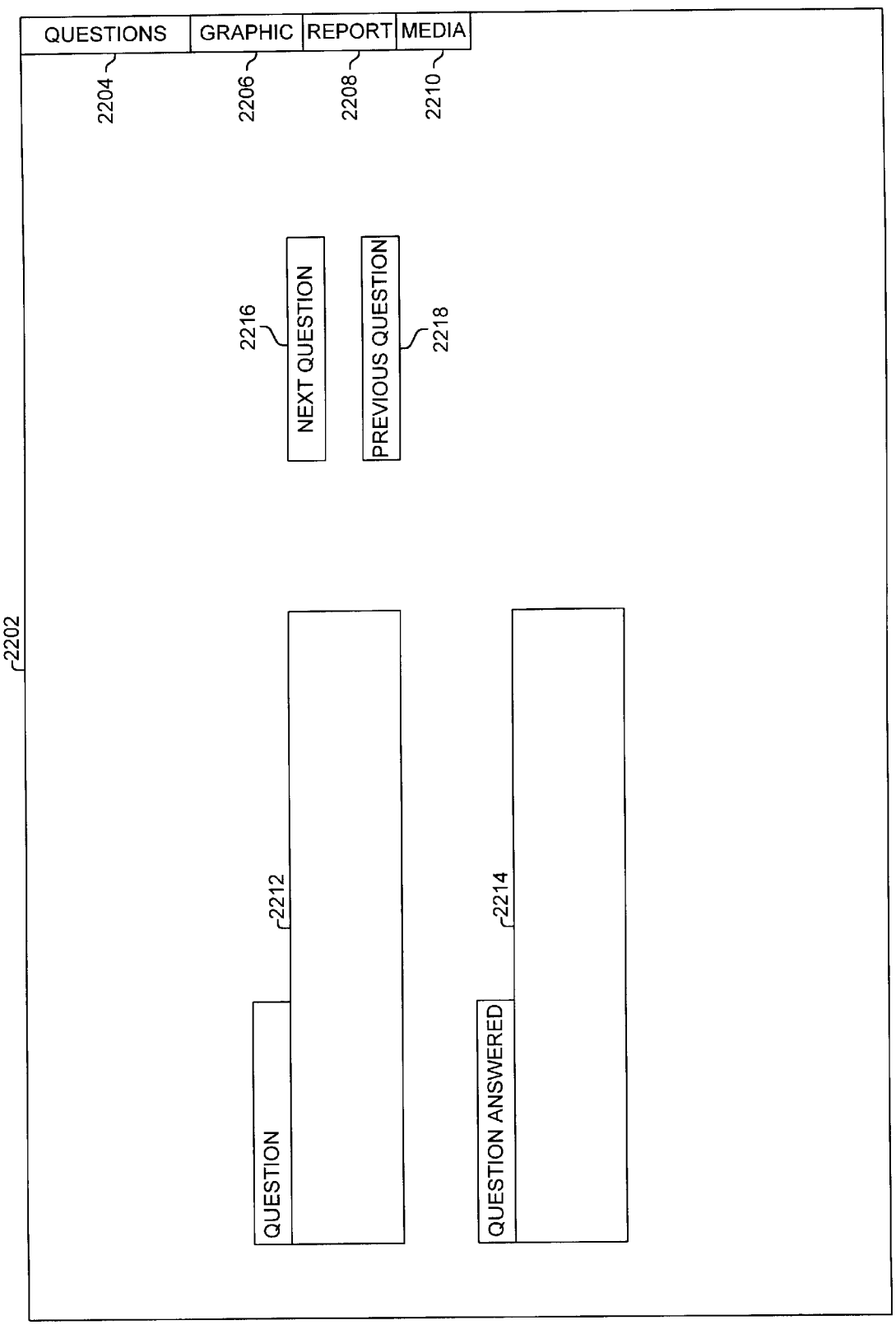
FIG. 22 is a screen display of the solution tool of FIG. 21 with a questions tab.

FIG. 21 depicts an exemplary embodiment of a solution tool 2102. The solution tool 2102 has interpreted solution code 2104, solution selections 2106, and solution requirements 2108.

The interpreted solution tool code 2104 operates the solution tool 2102 to generate selections, including questions and options, store information about a solution to a solution tool, such as options to questions, determine solution requirements based on selected options, and generate solution requirements, including one or more of a component list report, a graphic report, or media. The interpreted solution tool code 2104 determines which questions are to be generated to a user, which additional questions are to be generated to a user based upon prior selected options, and which components are to be added to solution requirements 236 based upon selected options. The interpreted solution code 2104 also controls hyperlinking to media, such as training media, and generating on-line help. The interpreted solution tool code 2104 preferably is JAVA code.

The interpreted solution tool code 2104 includes all of the graphics, including component graphics and template graphics, that may be needed for any potential solution to the solution tool 2102. The interpreted solution tool code 2104 also includes a list and identification of all of the components that may be selected as options for any potential solution to the solution tool 2102. Further, the interpreted solution code 2104 includes any potential hyperlink to media and any potential included media or on-line help.

For example, a first solution to the solution tool 2102 may have a first subset of selected components with their associated first subset of component graphics, template graphics, hyperlinks to training media, and on-line help. A second solution to the solution tool may have a second subset of selected components with their associated second subset of component graphics, template graphics, hyperlinks to training media, and on-line help.

The interpreted solution tool code 2104 dynamically builds a solution based upon selected options as the options are selected for the questions in the solution tool 2102.

Therefore, as questions are presented to the user and options are selected, the interpreted solution tool code 2104 selects a template graphic that corresponds to the total solution and adds component graphics to the template graphic to build a graphic report based upon individual selected options as those options are selected. Thus, for example, after options are selected for three questions, the graphic report may have a template graphic with two component graphics corresponding to two required components. Whereas, for example, after options are selected for five questions, the graphic report may have a template graphic with three component graphics corresponding to three required components.

Similarly, the interpreted solution code 2104 dynamically builds a component list report. Therefore, as questions are presented to the user and options are selected, the interpreted solution tool code 2104 selects components required for the solution and adds the required components to a component list report listing the required components for the solution. Thus, for example, after options are selected for three questions, a component list report with two required components may be displayed. Whereas, for example, after options are selected for five questions, the component list report may be displayed with three required components.

Additionally, the interpreted solution tool code 2104 dynamically generates hyperlinks to media for selected components, component graphics, and template graphics. Therefore, as questions are presented to the user and options are selected, the interpreted solution tool code 2104 selects hyperlinks required for the solution and attaches the hyperlink to component graphics or template graphics in the graphic report or to components in the component list report for the solution. Thus, for example, after options are selected for three questions, hyperlinks are attached to two required components in a component list report, to the template graphic in the graphic report, and to the two corresponding component graphics in the graphic report. Whereas, for example, after options are selected for five questions, hyperlinks are attached to three required components in a component list report, to the template graphic in the graphic report, and to the three corresponding component graphics in the graphic report.

The solution selections 2106 are generated to the user to determine requirements for a solution to the solution tool 2102. The solution selections include questions 2114 and options 2116. The questions 2114 outline requirements for a particular solution or a particular environment for the solution. The questions 2114 are to be answered by selecting options 2116 to the questions. The options 2116 include components that may be selected or text that can be entered as an answer. The options 2116 define alternatives for components required for a particular solution or a particular environment for the solution.

The solution requirements 2108 are the required components to the completed, or partially completed, solution tool 2102. The solution requirements 2108 include a component list report 2120 identifying the required components for the solution, a graphic report 2122 displaying the required components as template graphics and component graphics, hyperlinks to media 2122, and/or media not connected via a hyperlink. One of the graphic report 2118 or the component list report 2120 optionally may be omitted. The hyperlinks to media 2122 also are optional FIGS. 22–26 depict an exemplary embodiment of a solution tool 2202. The solution 2202 has a questions tab 2204, a graphic tab, 2206, a report tab, 2208, and an optional media tab 2210. The media tab 2210 need not be present or may be incorporated within the graphic tab 2206.

A solution to the solution tool is created by selecting options to questions in the questions tab 2204. Questions are displayed in the question panel 2212, and options, including answers, may be selected or entered in the question answered panel 2214. Next question and previous question buttons 2216 and 2218 enable navigation to preceding and proceeding questions. Once all of the questions have been answered, the particular solution to the solution tool will be complete. It will be appreciated that multiple particular solutions having different requirements may be completed for a solution tool.

Any option selected for a particular question may be changed at any point while completing a solution tool. The question to be changed may be selected from the question answered panel 2214. The question answered panel 2214 displays all of the options selected for the questions.

The option is selected from the question answered panel 2214, and the question will appear in the question panel 2212. A different option then may be selected for the question. However, selecting a different option to the question may require a user to re-answer other questions. Thus, for example, if a user decides to change an option for the seventh of ten questions, the user may have to re-answer all of the questions 7–10 or only one or more of the questions 7–10. Based on the option selected, the logic rules from the interpreted solution code will automatically determine if additional questions must be answered. An addition, if originally only 10 questions required answering, changing a selection of an option to an answer may require additional questions, such as 15 questions to be answered. Once again, the logic rules from the interpreted solution code shall automatically determine the questions to be answered and the selections to be made for requirements of the particular solution.

Figure 23:
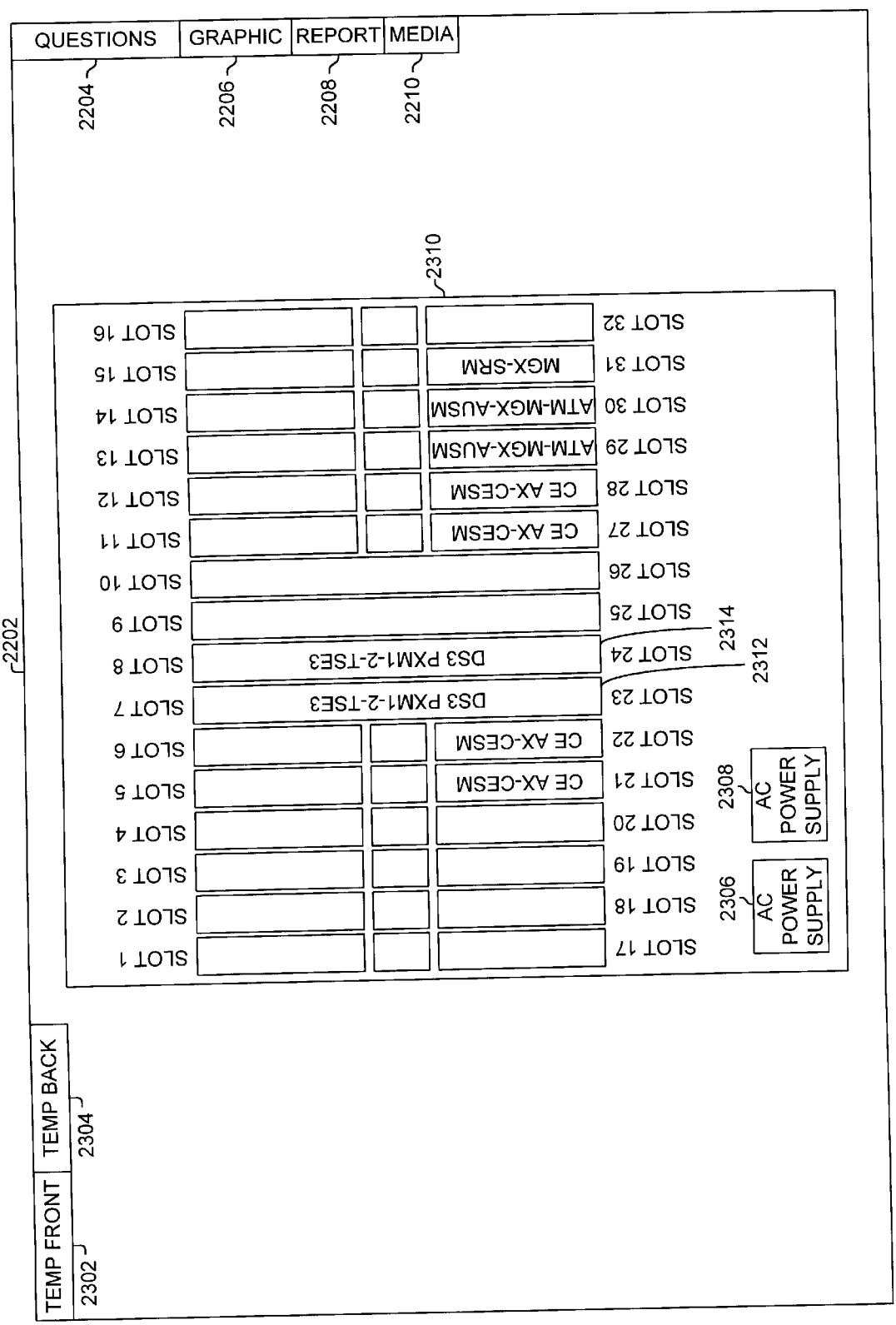
FIG. 23 is a screen display of the solution tool of FIG. 21 with a graphic tab.
Figure 24:
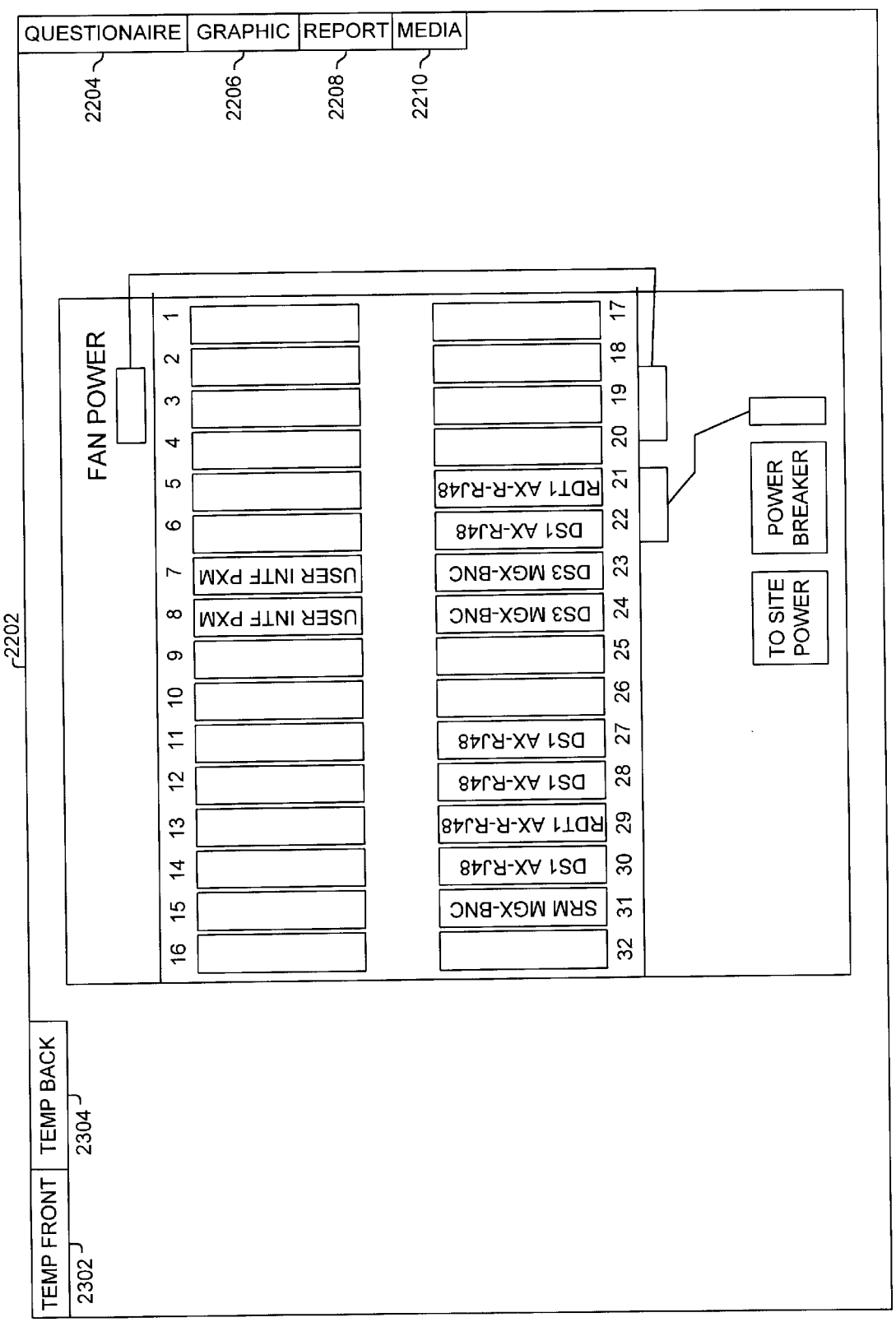
FIG. 24 is a screen display of the solution of FIG. 21 with another graphic tab.

FIGS. 23 and 24 depict exemplary embodiments of a graphic report that displays a solution based upon options selected for questions. While a user is selecting options for questions, the solutions tool code dynamically creates the graphic report for the solution and positions component graphics on a template graphic according to the order and position defined with the logic rules and the assembly and graphic panels.

In the examples of FIGS. 23 and 24, a front template button 2302 and a back template button 2304 can be used to display a graphic report showing the front of a device, and the back of a device, respectively. In this example, a telecommunications switch is displayed.

As a user using the solution tool 2202 selects options to the answers, component graphics are added to a template graphic based upon the selected options. Therefore, in the example of FIG. 23, after a user selects an option for a redundant power supply, the solution tool 2202 adds the component graphics for a redundant alternating current (AC) power supply 2306 and 2308. It will be appreciated that if the user of the solution tool 2202 changes the selected option so that a redundant power supply is not required, only a single component graphic for the AC power supply 2306 will be depicted on the template graphic of the telecommunications switch 2310.

In addition, as the user selects options, for example, for particular cards to be used in the telecommunications switch, component graphics for the cards 2312 and 2314 are added to the template graphic for the telecommunications switch 2310. Other component graphics are added dynamically as options are selected for questions to complete the solution to the solution tool 2202.

FIG. 25 depicts an exemplary embodiment of a component list report that can be generated for a solution to the solution tool 2202. As with the graphic report for the solution, the component list report 2502 is generated dynamically as a user selects options for questions. Thus, a user can view requirements needed for a solution when the user has completed all questions for the solution tool 2202 and can view current requirements after one or more options are selected to one or more questions. In the example of FIG. 25, the component list report 2502 has a component short description and a component long description identifying required components for the particular solution to the solution tool 2202. Other identifications, information, and listings may be included in the component list report.

FIG. 26 depicts an exemplary embodiment of media used in conjunction with a solution or completing the solution tool 2202. While a user is completing a solution for the solution tool 2202, the user may obtain training if required, such as learning more about a particular component or a set of components. In addition, when the solution is complete or partially complete, a user can select a component from the graphic report, a component from the component list report, or a hyperlink selected from the graphic report or the component list report to view additional information about the component or the solution. For example, the user can select a hyperlink associated with the card 2312 of FIG. 23 to display statistics about the card, information about how the card is to be installed in the telecommunications switch 2310, and digital video of the card being installed in the telecommunications switch. Additional information or media may be presented. It will be appreciated that the media tab 2210 need not be required. Preferably, a user will display or link to media by selecting a hyperlink from the graphic tab 2206 or the report tab 2208 or by selecting the component graphic or the component from the graphic tab or the report tab.

Those skilled in the art will appreciate that variations from the specific embodiments disclosed above are contemplated by the invention. The invention should not be restricted to the above embodiments, but should be measured by the following claims.

What is claimed is:

1. A system for dynamically determining requirements for a solution comprising:

at least one custom solution tool comprising solution selections for a custom solution having defined options an identification of specific components, and solution tool code that associates particular defined options to particular specific components and that, when executed, dynamically determines required components for the custom solution based on selection of defined options and dynamically builds at least one member of a group comprising a component list report identifying the required components and a graphic report depicting at least one graphic identifying at least one of the required components;

a solution tool creator configured to create the custom solution tool;

a main website configured to enable downloading the custom solution tool; and a solution system database configured to store the solution tool creator, the custom solution tool, and the main website and to operate the solution tool creator and the main website.

2. The system of claim 1 wherein the main website further is configured to enable uploading a completed custom solution to the custom solution tool.

3. The system of claim 1 further comprising a downloadable database configured to download the custom solution tool to a user.

4. The system of claim 3 wherein the solution system database further is configured to automatically update the custom solution tool after being downloaded to the user.

5. A system for creating a custom solution tool using at least one processor comprising:

a component engine configured to enter specific components that are selectable for at least one custom solution to the custom solution tool;

an options engine configured to enter selections for determining requirements for the custom solution, the selections comprising questions that outline the requirements and defined options selectable for the questions; and a rules engine configured to create logic rules comprising operators associating particular specific components to particular defined options and that, when executed for the custom solution, dynamically determine required components for the solution based upon selected defined options.

6. A system for creating a custom solution tool using at least one processor comprising:

a component engine configured to enter specific components that are selectable for at least one custom solution to the custom solution tool;

an options engine configured to enter selections for determining requirements for the custom solution, the selections comprising questions that outline the requirements and defined options selectable for the questions; and a graphic engine configured to create graphics and to assign the graphics to the specific components; and a rules engine configured to create logic rules comprising operators associating particular specific components to particular defined options and that, when executed for the custom solution, dynamically determine required components and required graphics for the custom solution based upon selected defined options.

7. The system of claim 6 wherein the graphics comprise at least one of a template graphic and a component graphic.

8. The system of claim 6 further comprising an assembly engine configured to assign an option variant to a first particular defined option that can be selected for a first particular question.

9. The system of claim 6 further comprising an assembly engine configured to create a base list of specific components required for a plurality of custom solutions.

10. The system of claim 6 further comprising an assembly engine configured to define properties for the specific components.

11. The system of claim 6 further comprising an assembly engine configured to enable entry of information associated with specific components and a total assembly of required components.

12. The system of claim 6 further comprising an assembly engine configured to designate positions and order of graphics for a graphic report configured to displays the required graphics.

13. The system of claim 6 further comprising an assembly engine configured to create a lookup table used for assembling the custom solution.

14. The system of claim 6 wherein the graphic engine further is configured to identify component information for specific components to be listed as required components in a component list report.

15. The system of claim 6 wherein the graphic engine further is configured to create a value for an add ons for at least one specific component.

16. The system of claim 6 wherein the graphic engine further is configured to define at least one additional component that automatically is included in the custom solution when a parent component is included in the custom solution.

17. The system of claim 6 wherein the graphics comprise a component graphic and a template graphic and wherein the custom solution tool further is configured to build the component graphic and the template graphic.

18. The system of claim 6 wherein the custom solution tool further is configured to position and size the graphics.

19. The system of claim 6 wherein the graphics comprise a component graphic and a template graphic and wherein the custom solution tool further is configured to size the component graphic and the template graphic and to position the component graphic on the template graphic.

20. The system of claim 6 wherein the rules engine further is configured to display logic rules created for defined options.

21. The system of claim 6 wherein the rules engine further is configured to display logic rules created for assembling the custom solution tool.

22. A system for creating a solution tool using at least one processor comprising:
   a solution tool creator configured to create a custom solution tool comprising selections with selectable defined options, an identification of specific components, and logic rules that associate particular specific components to particular defined options and that are configured to execute to for a custom solution to dynamically determine required components for the custom solution based on selected ones of the defined options; and
   a solution system database configured to store the solution tool creator and the custom solution tool and comprising solution creation code configured to operate the solution tool creator to enable creation of the custom solution tool.

23. A system for creating a custom solution tool using a super-user system comprising at least one processor, the system comprising:
   a solution tool creator comprising solution system code configured to define specific components that are selectable for at least one custom solution of the custom solution tool, graphics associated with the specific components, selectable defined options, and logic rules that associate particular specific components to particular defined options and that execute to determine required components and required graphics for the custom solution based on selected ones of the selectable defined options;
   a solution system database configured to store the solution tool creator and the custom solution tool; and
   solution creation code configured to operate the solution tool creator for creation of the custom solution tool and to store the custom solution tool on the solution system database.

24. The system of claim 23 wherein the solution creation code further is configured to automatically update the custom solution tool on a super-user system.

25. A system for creating a custom solution using at least one processor comprising:
   solution selections comprising questions and defined options, wherein at least one of the defined options can be selected for a corresponding one of the questions to result in the custom solution;
   solution requirements comprising at least one of a component list report listing required components for the custom solution and a graphic report displaying graphics comprising graphical representations of the required components for the custom solution; and
   an interpreted solution code comprising interpreted logic rules that associate particular specific components to particular defined options and configured to generate the questions, receive selected ones of the defined options, and process the selected options to determine the required components.

26. The system of claim 25 further comprising at least one hyperlink to media attached to at least one of the required components on at least one of the component list report and the graphic report.

27. The system of claim 25 wherein the graphics comprise at least one of a template graphic and a component graphic.

28. A system for creating a solution that identifies requirements for a user using at least one processor, the system comprising:
   a custom solution tool comprising solution tool code in an assembled logic format that is not executable, the solution tool code comprising selections for a custom solution with defined options, an identification of specific components, and assembled logic rules that associate particular defined options to particular specific components and that when executed, dynamically determine rend components for the custom solution based on selection of defined options;
   an interpreter configured to automatically convert the solution tool code from the assembled logic format to an interpreted solution tool code that is executable for determining the required components for the custom solution and for building the custom solution with the required components based on the selected defined options; and
   a downloadable database configured to download the interpreter and the custom solution tool to the user.

29. The system of clam 28 wherein the interpreter further comprises drivers to enable the user to download the custom solution tool.

30. The system of claim 28 wherein the interpreted solution tool code comprises JAVA code.

31. The system of claim 28 further comprising a solution system database configured to store the custom solution tool and to transmit the custom solution tool to the downloadable database.

32. A system for creating a custom solution using at least one processor comprising:
   a rules engine comprising a point-and-click control pad with logic buttons having operators, the rules engine configured to create logic rules, each from selection of at least one of the logic buttons, at least one specific component listed in a component list, and at least one defined selection listed in an option list and to convert the created logic rules to assembled logic that associate the at least one specific component to the at least one defined selection; and
   an interpreter configured to dynamically convert the assembled logic to an interpreted solution tool code format that, when executed, dynamically determines required components for the solution based on selected selections.

33. A system for creating a custom solution using at least one processor comprising:
a custom solution tool comprising solution tool code in an assembled logic format; and
an interpreter configured to automatically convert the custom solution tool from the assembled logic format to an interpreted solution tool that is executable;
wherein the interpreted custom solution tool comprises displayable questions that outline requirements for at least one custom solution, selectable defined options that define alternatives to the questions, and interpreted solution tool code comprising interpreted logic rules that associate particular specific components to particular defined options and that are configured to execute to determine required components for the custom solution based upon selected ones of the defined options.

34. The system of claim 33 fiber comprising at least one member of a group comprising a component list report listing the required components and a graphic report graphically depicting the required components.

35. The system of claim 34 further comprising at least one hyperlinks to media attached to at least one of the required components in at least one of the component list report and the graphic report.

36. The system of claim 34 wherein the graphic report comprises at least one of a template graphic and a component graphic.

37. A rules engine for creating, for a custom solution tool, logic rules using specific components listed in a component list and defined selections listed in an options list and using at least one processor comprising:
a point-and-click control pad with logic buttons having operators and configured to enable creating at least a first logic rule that associates at least one of the specific components to at least one of the defined selections using at least a first operator and at least a second logic rule that associates an option variant for the at least one specific component to at least one other defined selection using at least a second operator; and
at least one window configured to display the at least first and second logic rules;
wherein the rules engine is configured to convert the at least first and second logic rules to assembled logic that, when executed, dynamically determines at least one required component for a custom solution to the custom solution tool based on at least one selected defined selection.

38. A system for creating a custom solution tool using at least one processor comprising:
a component panel configured to create a list of specific components needed for at least one custom solution to the custom solution tool;
an options panel configured to create selections comprising questions that outline requirements for the custom solution and defined options that identify alternatives to the questions; and
a rules engine panel configured to create logic rules comprising operators associating particular specific components to particular defined options that can be selected to the questions and that, when executed, determine required components for the custom solution based upon selected options.

39. A system for creating a custom solution tool using at least one processor comprising:
a component panel configured to create a list of specific components needed for at least one custom solution to the custom solution tool;
an options panel configured to create selections comprising questions that outline requirements for the custom solution and defined options that identify alternatives to the questions;
a graphic panel configured to create graphics associated with the specific components and to assign at least one of the graphics to at least one of the specific components; and
a rules engine panel configured to create logic rules comprising operators associating particular specific components to particular defined options that can be selected from the questions and that, when executed, determine required components and required graphics for the custom solution based upon selected options.

40. The system of claim 39 further comprising an assembly panel configured to define properties for the specific components and to assign positions and placement order for the graphics.

41. The system of claim 40 wherein defining properties comprises assigning an option variant to at least one particular defined option selected for at least one question.

42. The system of claim 40 wherein defining properties comprises creating a base list of specific components required for a plurality of custom solutions.

43. The system of claim 40 wherein the assembly panel comprises an assembly tab configured to enable entry of a description for the custom solution tool.

44. The system of claim 40 wherein the assembly panel comprises an add ons tab configured to enable entry of details associated with the specific components and a total assembly of the required components.

45. The system of claim 40 wherein the assembly panel comprises a variants tab configured to assign a variant name to an outcome for at least one of the selected options.

46. The system of claim 40 wherein the assembly panel comprises a grids tab configured to designate positions and order of the graphics for a graphic report.

47. The system of claim 40 wherein the assembly panel comprises a base list tab configured to enable creation of a base list of required components for a plurality of custom solutions.

48. The system of claim 40 wherein the assembly panel comprises a lookup tab configured to enable creation of a lookup table used for assembling the custom solution.

49. The system of claim 39 wherein the graphic panel comprises a component tab configured to identify specific component information for a component list report.

50. The system of claim 39 wherein the graphic panel comprises a properties tab configured to enable creation of a value for an add on for at least one specific component.

51. The system of claim 39 wherein the graphic panel comprises an inclusions tab configured to define at least one additional specific component that automatically is included in the custom solution when a parent component is included in the custom solution.

52. The system of claim 39 wherein the graphic panel comprises a graphic tab configured to assign the graphics to the specific components for inclusion in the custom solution tool.

53. The system of claim 39 wherein the custom solution tool comprises a graphic build window configured to build the graphics for the specific components.

54. The system of claim 39 wherein the custom solution tool comprises a graphic build window configured to assign the graphics to tie specific components.

55. The system of claim 39 wherein the graphics comprise a component graphic and a template graphic and wherein the custom solution tool comprises a graphic build window configured to build the component graphic and the template graphic.

56. The system of claim 39 wherein the custom solution tool comprises a graphic developer window configured to position and size the graphics.

57. The system of claim 39 wherein the graphics comprise a component graphic and a template graphic and wherein the custom solution tool comprises a graphic developer window configured to size the component graphic and the template graphic and to position the component graphic on the template graphic.

58. The system of claim 39 wherein the rules panel comprises logic buttons having operators.

59. The system of claim 39 wherein the rules panel comprises an options window configured to display logic rules cab for defined options.

60. The system of claim 39 wherein the rules panel comprises an assembly window configured to display logic rules created for assembling a whole custom solution tool.

61. A system for creating a sealable solution using at least one processor comprising:
    a question panel comprising questions that outline requirements for at least one custom solution and defined options that identify alternatives to the questions;
    a graphic report panel comprising a template graphic for the custom solution and component graphics that graphically depict specific components required for the custom solution; and
    a component list report panel comprising a list of specific components required for the custom solution.

62. The system of claim 61 further comprising a media panel for enabling attachment of training media for at least one of the specific components.

63. A method for creating a custom solution tool using at least one processor comprising:
    creating a component list having a plurality of specific components;
    creating selections having questions that outline requirements for at least one custom solution to the custom solution tool and selectable defined options that identify alternatives to the questions; and
    creating logic rules that assign particular specific components to particular defined options and that, when executed, determine required components for the custom solution based upon the selected options.

64. A method for creating a custom solution tool using at least one processor comprising:
    creating a component list having a plurality of specific components;
    creating selections having questions that outline requirements for at least one custom solution to the custom solution tool and selectable defined options that identify alternatives to the questions;
    creating graphics each of which is assigned to at least one of the specific components; and
    creating logic rules that assign particular specific components to particular defined options and that, when executed, determine required components and required graphics for the custom solution based upon the selected options.

65. The method of claim 64 further comprising assigning a hyperlink to media to at least one member of a group comprising the required components and the required graphics.

66. The method of claim 64 further comprising defining properties for the specific components and assigning positions and placement order for the graphics.

67. The method of claim 66 wherein defining properties comprises assigning an option variant to at least one of the particular defined options selectable for at least one of the questions.

68. The method of claim 66 wherein defining properties comprises creating a base list of specific components required for a plurality of custom solutions.

69. The method of claim 64 where the graphics comprise at least one member of a group comprising a template graphic and a component graphic.

70. The method of claim 64 further comprising creating at least one hyperlinks to media and attaching the hyperlinks to the at least one of the required components.

71. A method for creating a custom solution comprising:
    processing on a processor interpreted solution tool code comprising interpreted logic rules that associate each of a plurality of specific components to at least one corresponding defined option;
    upon processing the interpreted solution code, generating to a display questions that outline the custom solution and particular defined options that can be selected for the questions;
    determining required components for the solution based on selected defined options; and
    generating at least one member of a group comprising a component list report listing the required components and a graphic report graphically depicting the required components.

72. The method of claim 71 further comprising attaching at least one hyperlinks to media for at least one of the required components in at least one of the component list report and the graphic report.

73. The method of claim 71 wherein the graphic report comprises a template graphic and at least one component graphic.

* * * * *

UNITED STATES PATENT AND TRADEMARK OFFICE
CERTIFICATE OF CORRECTION

PATENT NO. : 6,615,198 B1  
DATED : September 2, 2003  
INVENTOR(S) : Daniel J. Aldrich It is certified that error appears in the above-identified patent and that said Letters Patent is hereby corrected as shown below:

Column 23,  
Line 48, insert a comma after "options".

Column 24,  
Line 62, replace "displays" with -- display --.

Column 25,  
Line 6, replace "ons" with -- on --.

Column 26,  
Line 33, insert a comma after "that".  
Line 34, replace "rend" with -- required --.

Column 27,  
Line 20, replace "fiber" with -- further --.

Column 29,  
Line 23, delete "sealable".

Column 30,  
Line 28, replace "hyperlinks" with -- hyperlink --.

Signed and Sealed this

Third Day of February, 2004

JON W. DUDAS  
*Acting Director of the United States Patent and Trademark Office*